(12) United States Patent
Soma et al.

(10) Patent No.: US 9,231,446 B2
(45) Date of Patent: Jan. 5, 2016

(54) MOTOR DRIVE DEVICE AND VEHICLE

(71) Applicant: KABUSHIKI KAISHA YASKAWA DENKI, Kitakyushu-shi (JP)

(72) Inventors: Akira Soma, Kitakyushu (JP); Hidenori Hara, Kitakyushu (JP); Yushi Takatsuka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/224,072

(22) Filed: Mar. 25, 2014

(65) Prior Publication Data

US 2014/0202781 A1     Jul. 24, 2014

Related U.S. Application Data

(63) Continuation of application No. PCT/JP2011/072477, filed on Sep. 29, 2011.

(51) Int. Cl.
| | |
|---|---|
| B60K 1/02 | (2006.01) |
| H02K 3/00 | (2006.01) |
| H02K 3/50 | (2006.01) |
| H02K 5/15 | (2006.01) |
| H02K 5/20 | (2006.01) |
| H02K 5/22 | (2006.01) |
| H02K 11/00 | (2006.01) |
| H02K 5/04 | (2006.01) |
| H02K 9/00 | (2006.01) |

(52) U.S. Cl.
CPC .. *H02K 3/00* (2013.01); *H02K 3/50* (2013.01); *H02K 5/04* (2013.01); *H02K 5/15* (2013.01); *H02K 5/20* (2013.01); *H02K 5/225* (2013.01); *H02K 9/00* (2013.01); *H02K 11/0073* (2013.01)

(58) Field of Classification Search
CPC .......................... A61G 2203/14; Y02T 10/7005
USPC ........................... 180/65.1–65.31; 310/58–59
See application file for complete search history.

(56) References Cited

U.S. PATENT DOCUMENTS

| | | | | |
|---|---|---|---|---|
| 4,809,640 A | * | 3/1989 | Pilley et al. | 118/257 |
| 4,818,571 A | * | 4/1989 | Pilley et al. | 427/286 |

(Continued)

FOREIGN PATENT DOCUMENTS

| | | |
|---|---|---|
| CN | 102130542 | 7/2011 |
| EP | 1950870 | 7/2008 |

(Continued)

OTHER PUBLICATIONS

Japanese Office Action for corresponding JP Application No. 2013-091019, Mar. 11, 2014.

(Continued)

*Primary Examiner* — John Walters
*Assistant Examiner* — James Triggs
(74) *Attorney, Agent, or Firm* — Mori & Ward, LLP

(57) ABSTRACT

A motor drive device includes a motor including a high-speed drive winding and a low-speed drive winding, a winding switching portion switching the connection states of the high-speed drive winding and the low-speed drive winding of the motor, a power conversion portion connected to the motor, and a plurality of case portions housing at least the motor, the winding switching portion, and the power conversion portion, while the plurality of case portions are coupled to each other.

19 Claims, 15 Drawing Sheets

(56) References Cited

U.S. PATENT DOCUMENTS

| | | |
|---|---|---|
| 5,006,744 A | 4/1991 | Archer et al. |
| 5,327,064 A | 7/1994 | Arakawa et al. |
| 5,889,345 A | 3/1999 | Iwata et al. |
| 6,081,056 A | 6/2000 | Takagi et al. |
| 6,200,108 B1 | 3/2001 | Caudill et al. |
| 6,847,185 B2 | 1/2005 | Kume et al. |
| 8,614,527 B2 * | 12/2013 | Nagao et al. .......... 310/58 |
| 2010/0237815 A1 | 9/2010 | Higashikawa et al. |
| 2010/0328901 A1 | 12/2010 | Minato et al. |
| 2014/0077633 A1 | 3/2014 | Nagao et al. |

FOREIGN PATENT DOCUMENTS

| | | |
|---|---|---|
| JP | 63-134877 | 6/1988 |
| JP | 02-228240 | 9/1990 |
| JP | 10-028349 | 1/1998 |
| JP | 0859447 | 8/1998 |
| JP | 2001-128417 | 5/2001 |
| JP | 2003-018785 | 1/2003 |
| JP | 2003-111492 | 4/2003 |
| JP | 2006-197781 | 7/2006 |
| JP | 2008-193863 | 8/2008 |
| JP | 2010-017055 | 1/2010 |
| JP | 2011-050150 | 3/2011 |
| JP | 2011-147253 | 7/2011 |

OTHER PUBLICATIONS

"Heart of EV, Automotive Electrical Drive System", Yaskawa News, Summer 2011 No. 295, Jun. 1, 2011, pp. 2-5.

International Search Report for corresponding International Application No. PCT/JP2011/072477, Nov. 1, 2011.

Written Opinion for corresponding International Application No. PCT/JP2011/072477, Nov. 1, 2011.

Korean Office Action for corresponding KR Application No. 10-2014-7009039, May 6, 2015.

Extended European Search Report for corresponding EP Application No. 11873390.6—1905, Jul. 27, 2015.

Chinese Office Action for corresponding CN Application No. 201180073786.4, Sep. 2, 2015.

* cited by examiner

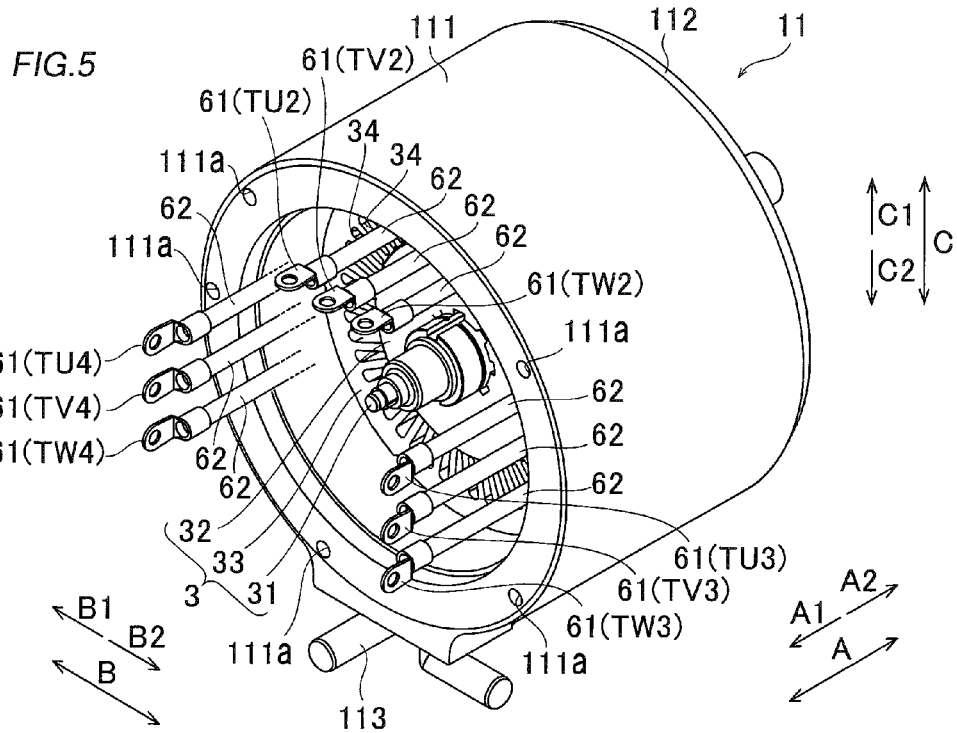
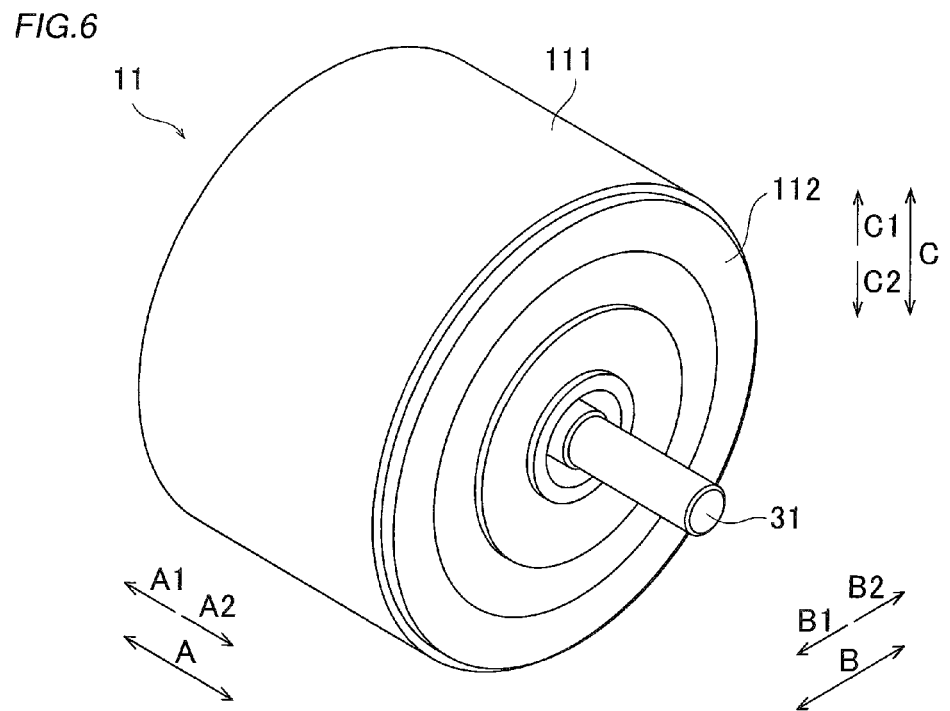

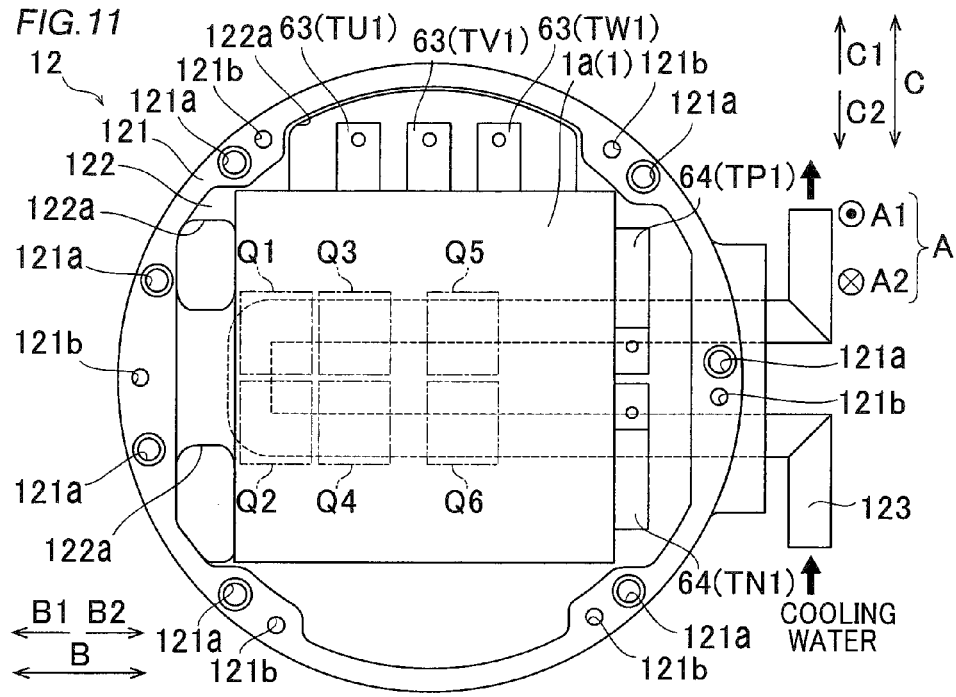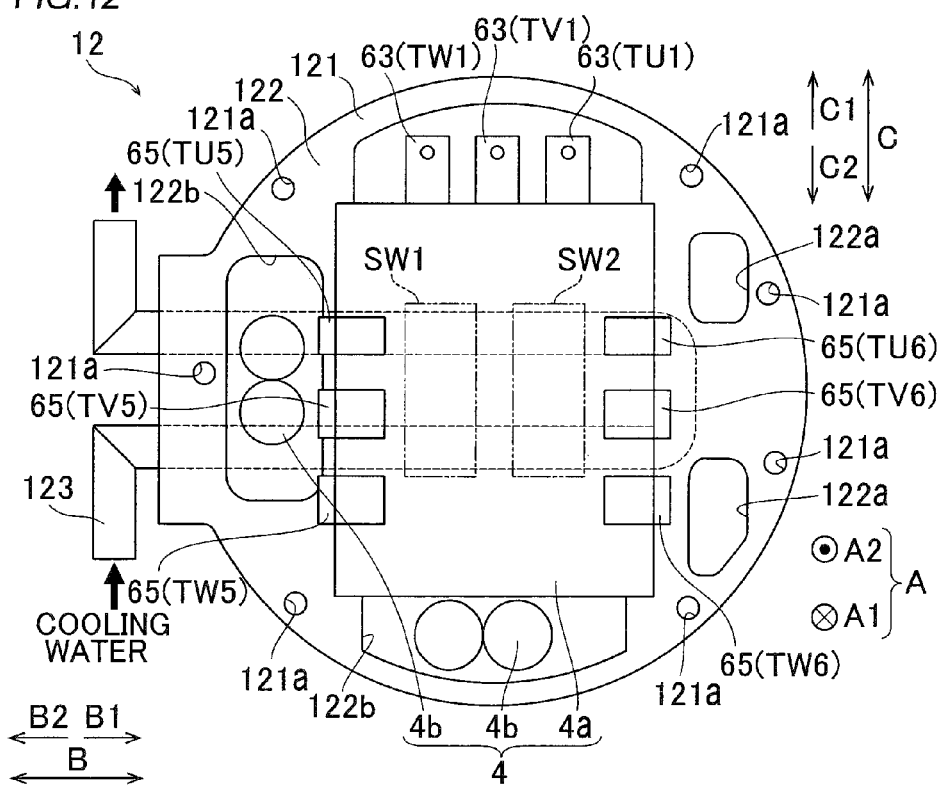

MOTOR DRIVE DEVICE AND VEHICLE

CROSS-REFERENCE TO RELATED APPLICATION

This application is a continuation of PCT/JP2011/072477, Motor Drive Device and Vehicle, Sep. 29, 2011, Akira Soma, Hidenori Hara, and Yushi Takatsuka.

BACKGROUND OF THE INVENTION

1. Field of the Invention

The present invention relates to a motor drive device and a vehicle.

2. Description of the Background Art

In general, a motor drive device including a motor including a high-speed drive winding and a low-speed drive winding is known. Such a motor drive device is disclosed in Japanese Patent Laying-Open No. 2010-17055, for example.

In the aforementioned Japanese Patent Laying-Open No. 2010-17055, there is disclosed a motor drive device including a motor including a high-speed drive winding and a low-speed drive winding, a winding switching portion switching the connection states of the two windings of the motor, and an inverter (power conversion portion) connected to the motor.

In the conventional motor drive device including the motor, the winding switching portion, and the power conversion portion disclosed in the aforementioned Japanese Patent Laying-Open No. 2010-17055, the motor, the winding switching portion, and the power conversion portion are generally housed in separate case portions and placed separately.

SUMMARY OF THE INVENTION

A motor drive device according to a first aspect includes a motor including a high-speed drive winding and a low-speed drive winding, a winding switching portion switching the connection states of the high-speed drive winding and the low-speed drive winding of the motor, a power conversion portion connected to the motor, and a plurality of case portions housing at least the motor, the winding switching portion, and the power conversion portion, while the plurality of case portions are coupled to each other.

A vehicle according to a second aspect includes a vehicle body portion and a motor drive portion provided inside the vehicle body portion, while the motor drive portion includes a motor including a high-speed drive winding and a low-speed drive winding, a winding switching portion switching the connection states of the high-speed drive winding and the low-speed drive winding of the motor, a power conversion portion connected to the motor, and a plurality of case portions housing at least the motor, the winding switching portion, and the power conversion portion, and the plurality of case portions are coupled to each other.

BRIEF DESCRIPTION OF THE DRAWINGS

FIG. 5 is a perspective view showing a first case portion of the motor drive portion shown in FIG. 3;

FIG. 6 is a perspective view of the first case portion shown in FIG. 5 as viewed from a side opposite to a side shown in FIG. 5;

FIG. 11 is a plan view of the second case portion shown in FIGS. 9 and 10 as viewed from the side along arrow A1;

FIG. 12 is a plan view of the second case portion shown in FIGS. 9 and 10 as viewed from a side along arrow A2;

DESCRIPTION OF THE EMBODIMENTS

An embodiment is hereinafter described on the basis of the drawings.

The structure of a vehicle 100 according to the embodiment is now described with reference to FIG. 1. The structure shown in FIG. 1 is a representative example showing the structure of a vehicle including a winding switching type motor drive portion.

Figure 1:
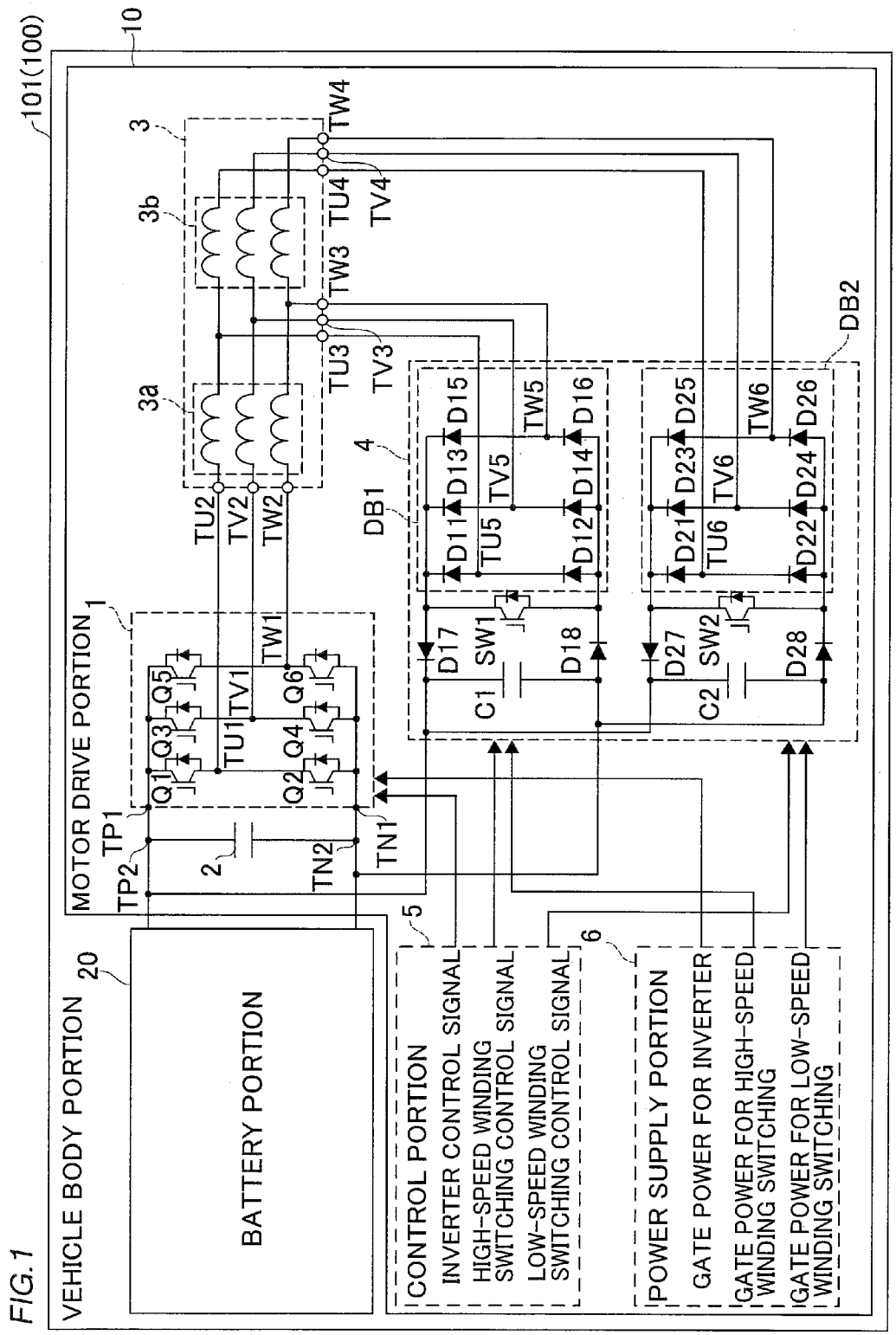
FIG. 1 is a block diagram showing the overall structure of a vehicle according to an embodiment.

As shown in FIG. 1, the vehicle 100 includes a vehicle body portion 101, a motor drive portion 10 provided inside the vehicle body portion 101, and a battery portion 20 connected to the motor drive portion 10. The motor drive portion 10 is an example of the "motor drive device".

The motor drive portion 10 is configured to include an inverter portion 1, a smoothing capacitor 2, a motor 3, a winding switching portion 4, a control portion 5, and a power supply portion 6. The inverter portion 1 is an example of the "power conversion portion".

The inverter portion 1 is configured to convert direct-current power input from the battery portion 20 into three-phase (U-phase, V-phase, and W-phase) alternating-current power and output the three-phase alternating-current power to the motor 3. The inverter portion 1 has direct-current input terminals TP1 and TN1 connected to the battery portion 20 and alternating-current output terminals TU1, TV1, and TW1 connected to the motor 3. The direct-current input terminals TP1 and TN1 of the inverter portion 1 are connected with terminals TP2 and TN2 of the smoothing capacitor 2, respectively. This smoothing capacitor 2 is provided to smooth the direct-current power input from the battery portion 20.

The inverter portion 1 is configured to include six switch elements Q1, Q2, Q3, Q4, Q5, and Q6 for power conversion. The switch elements Q1 and Q2 are configured to perform U-phase power conversion. The switch elements Q3 and Q4 are configured to perform V-phase power conversion. The switch elements Q5 and Q6 are configured to perform W-phase power conversion. The switch elements Q1 to Q6 each are made of a SiC semiconductor.

The motor 3 is configured to be driven in correspondence to three-phase alternating-current power supplied from the inverter portion 1. The motor 3 is configured to include a three-phase winding 3a for high-speed drive and a three-phase winding 3b for low-speed drive. The windings 3a and 3b are examples of the "high-speed drive winding" and the "low-speed drive winding", respectively.

The windings 3a and 3b are electrically connected in series. Terminals TU2, TV2, and TW2 of three phases (U-phase, V-phase, and W-phase) on a first side of the winding 3a are connected to the inverter portion 1. Terminals TU3, TV3, and TW3 of the three phases on a second side of the winding 3a and a first side of the winding 3b are connected to a diode bridge DB1 of the winding switching portion 4 described later. Terminals TU4, TV4, and TW4 on a second side of the winding 3b are connected to a diode bridge DB2 of the winding switching portion 4 described later.

The winding switching portion 4 has a function of switching the connection states of the windings 3a and 3b of the motor 3. Specifically, the winding switching portion 4 is configured to include a high-speed winding switch SW1 to short the terminals TU3, TV3, and TW3 of the motor 3 and a low-speed winding switch SW2 to short the terminals TU4, TV4, and TW4 of the motor 3. The high-speed winding switch SW1 and the low-speed winding switch SW2 are examples of the "switch element". The high-speed winding switch SW1 and the low-speed winding switch SW2 each are made of a SiC semiconductor.

The winding switching portion 4 is configured to include the diode bridge DB1 having terminals TU5, TV5, and TW5 connected to the terminals TU3, TV3, and TW3 of the motor 3 and a capacitor C1 configured to protect the winding 3a of the motor 3. The high-speed winding switch SW1, the diode bridge DB1, the capacitor C1, and the smoothing capacitor 2 are electrically connected to each other in parallel.

The winding switching portion 4 is configured to include the diode bridge DB2 having terminals TU6, TV6, and TW6 connected to the terminals TU4, TV4, and TW4 of the motor 3 and a capacitor C2 configured to protect the winding 3b of the motor 3. The low-speed winding switch SW2, the diode bridge DB2, the capacitor C2, and the smoothing capacitor 2 are electrically connected to each other in parallel.

The diode bridge DB1 is constituted by six diodes D11, D12, D13, D14, D15, and D16 configured to rectify three-phase (U-phase, V-phase, and W-phase) alternating current output from the terminals TU3, TV3, and TW3 of the motor 3. The diodes D11 and D12 are configured to rectify U-phase alternating current. The diodes D13 and D14 are configured to rectify V-phase alternating current. The diodes D15 and D16 are configured to rectify W-phase alternating current. Two diodes D17 and D18 are provided on the direct-current output side of the diode bridge DB1.

Similarly, the diode bridge DB2 is constituted by six diodes D21, D22, D23, D24, D25, and D26 configured to rectify three-phase (U-phase, V-phase, and W-phase) alternating current output from the terminals TU4, TV4, and TW4 of the motor 3. The diodes D21 and D22 are configured to rectify U-phase alternating current. The diodes D23 and D24 are configured to rectify V-phase alternating current. The diodes D25 and D26 are configured to rectify W-phase alternating current. Two diodes D27 and D28 are provided on the direct-current output side of the diode bridge DB2.

The control portion 5 is configured to control the inverter portion 1 and the winding switching portion 4 by outputting control signals (an inverter control signal, a high-speed winding switching control signal, and a low-speed winding switching control signal) to the inverter portion 1 and the winding switching portion 4. The power supply portion 6 is configured to supply power (gate power for the inverter) for operating the switch elements Q1 to Q6 of the inverter portion 1 and power (gate power for high-speed winding switching and gate power for low-speed winding switching) for operating the high-speed winding switch SW1 and the low-speed winding switch SW2 of the winding switching portion 4 to the inverter portion 1 and the winding switching portion 4, respectively.

The schematic configuration (structure) of the motor drive portion 10 according to the embodiment is now described with reference to FIGS. 2 to 4.

Figure 2:
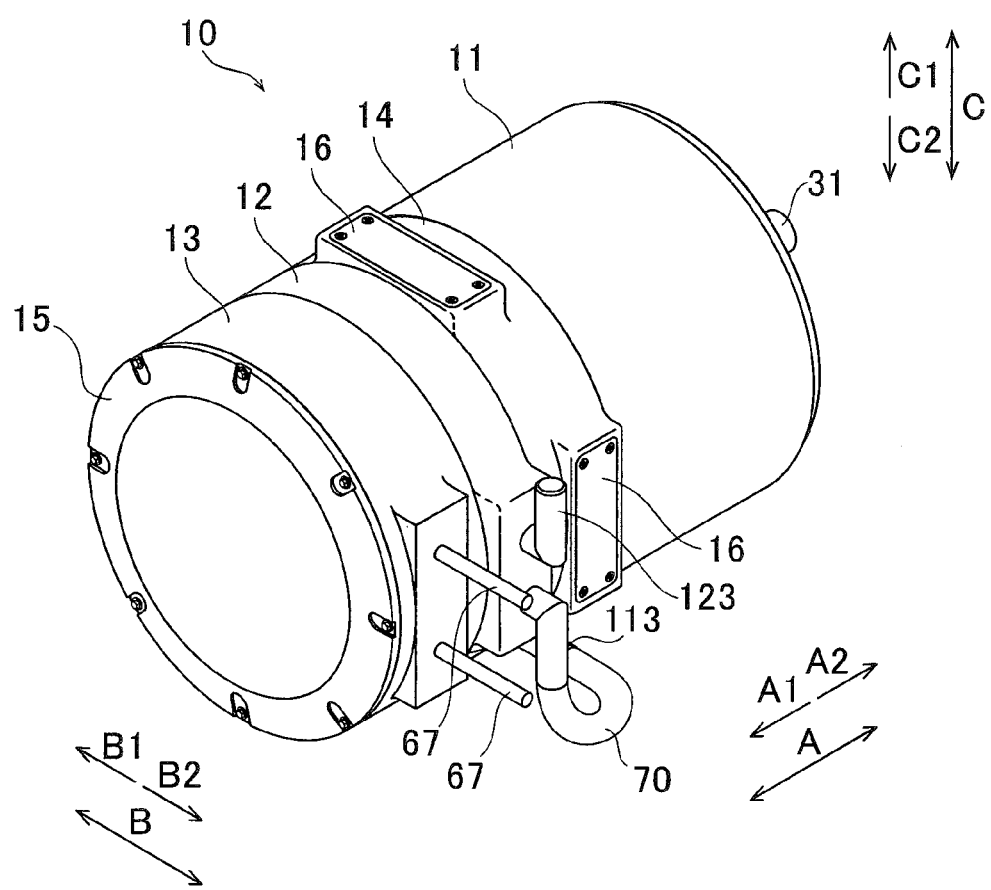
FIG. 2 is a perspective view showing the overall structure of a motor drive portion according to the embodiment.
Figure 3:
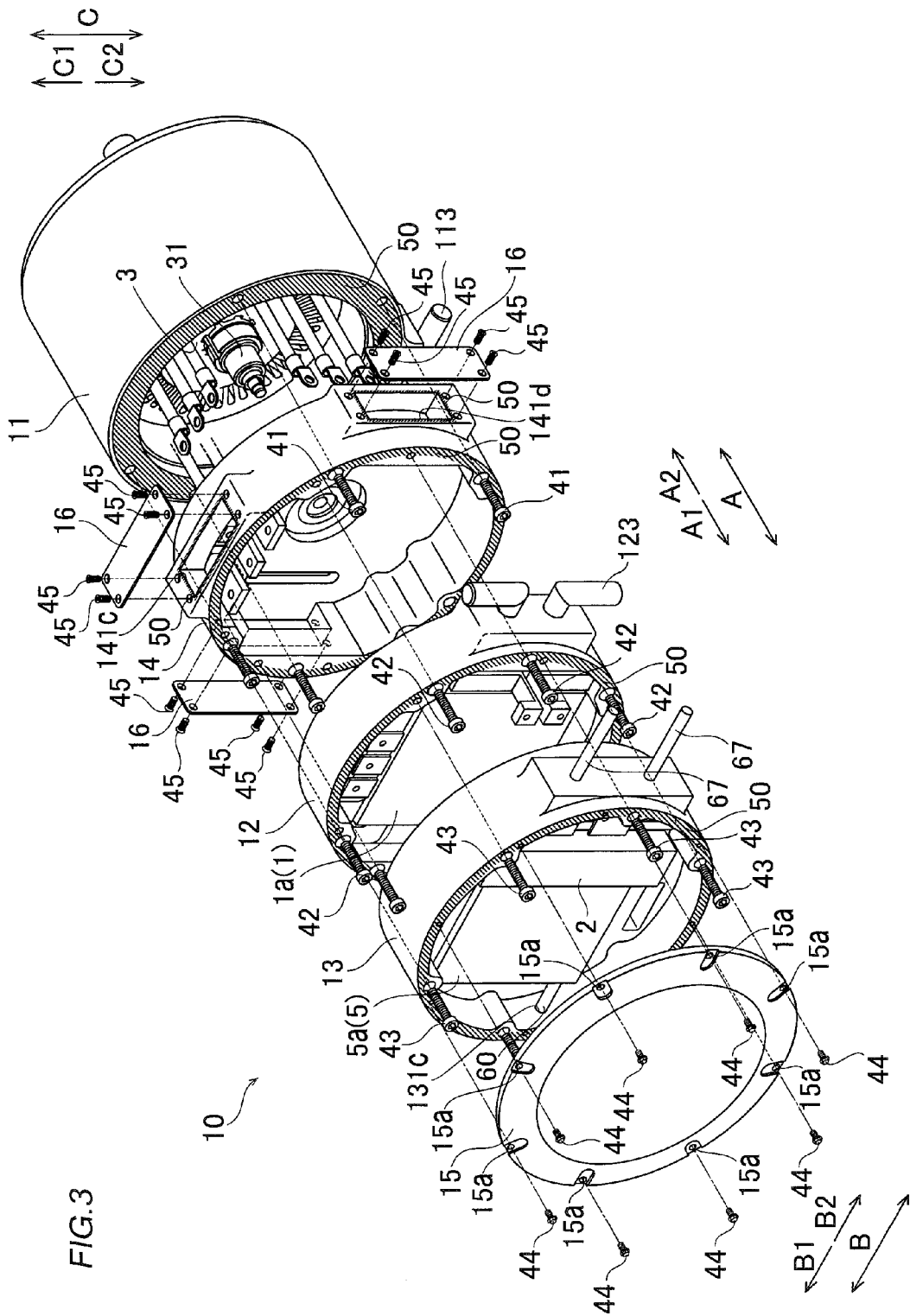
FIG. 3 is an exploded perspective view of the motor drive portion shown in FIG. 2.
Figure 4:
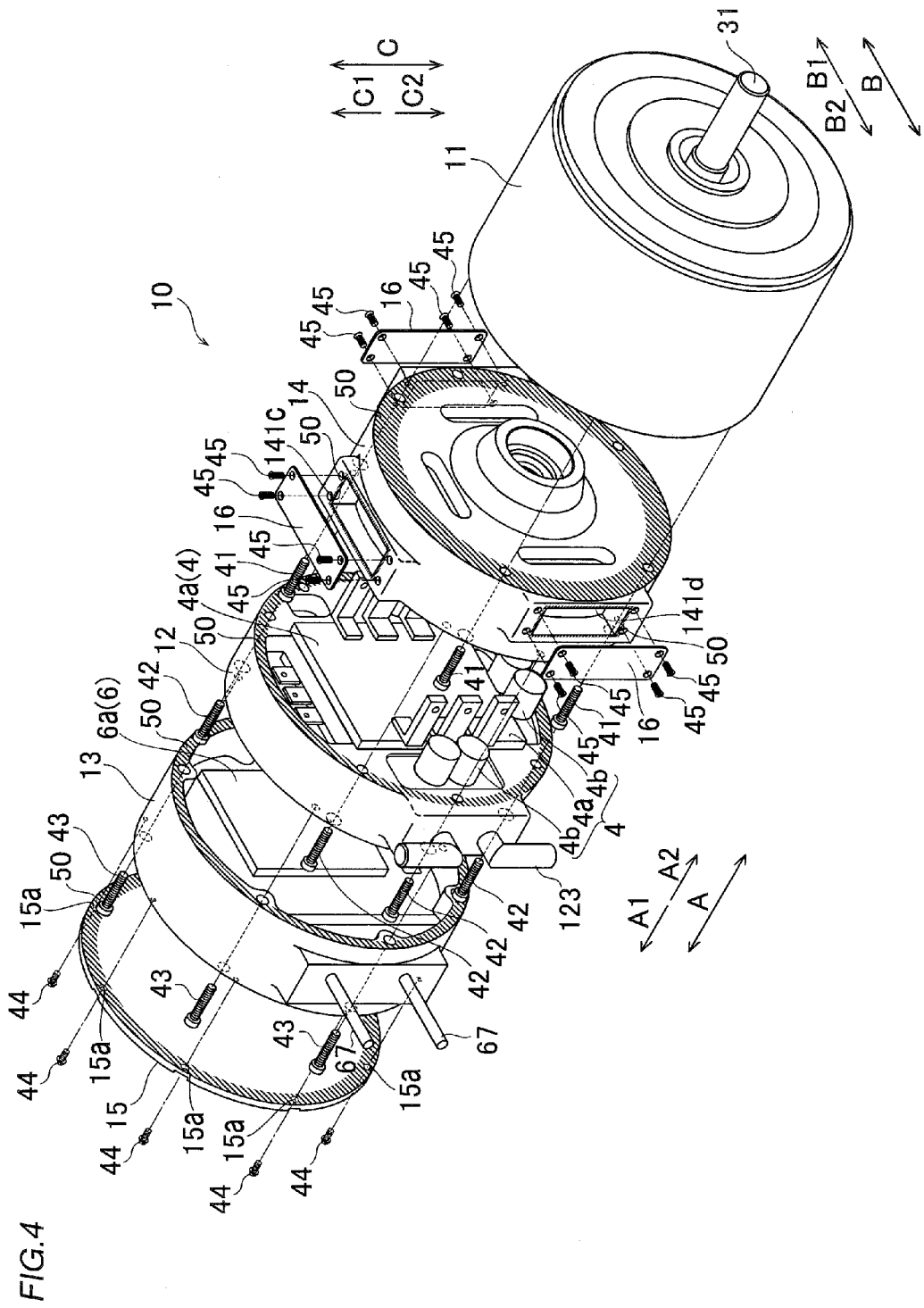
FIG. 4 is an exploded perspective view of the motor drive portion shown in FIG. 3 as viewed from a side opposite from a side shown in FIG. 3.

As shown in FIGS. 2 to 4, the motor drive portion 10 includes a first case portion 11 housing the motor 3, a second case portion 12 housing the inverter portion 1 and the winding switching portion 4, a third case portion 13 housing the smoothing capacitor 2, the control portion 5, and the power supply portion 6, and a fourth case portion 14 arranged between the first case portion 11 and the second case portion 12. The first case portion 11, the fourth case portion 14, the second case portion 12, and the third case portion 13 are made of metal such as aluminum. The first case portion 11, the second case portion 12, the third case portion 13, and the fourth case portion 14 are examples of the "case portion".

The first case portion 11, the fourth case portion 14, the second case portion 12, and the third case portion 13 are arranged in this order along the extensional direction (the axial direction (direction $\underline{A}$) of the motor 3) of a rotating shaft 31 of the motor 3 described later. As shown in FIGS. 3 and 4, the first case portion 11, the fourth case portion 14, the second case portion 12, and the third case portion 13 are formed in a cylindrical shape extending along the direction $\underline{A}$. The first case portion 11, the fourth case portion 14, the second case portion 12, and the third case portion 13 formed in the cylindrical shape have outer diameters substantially equal to each other.

According to this embodiment, the first case portion 11, the fourth case portion 14, the second case portion 12, and the third case portion 13 are fastened to each other in the direction $\underline{A}$ with hexagon socket screws 41, 42, and 43 to be coupled to each other, as shown in FIGS. 2 to 4. Specifically, the first case portion 11 and the fourth case portion 14 are fastened to each other with the hexagon socket screws 41 to be coupled to each other, as shown in FIGS. 3 and 4. The fourth case portion 14 and the second case portion 12 are fastened to each other with the hexagon socket screws 42 to be coupled to each other. The second case portion 12 and the third case portion 13 are fastened to each other with the hexagon socket screws 43 to be coupled to each other. The hexagon socket screws 41 to 43 are examples of the "fastening member".

As shown in FIGS. 2 to 4, a disc-shaped first lid 15 configured to seal the third case portion 13 is provided on the side (side along arrow A1) of the third case portion 13 opposite to the first case portion 11, the second case portion 12, and the fourth case portion 14. Three openable and closable second lids 16 in a substantially rectangular shape configured to cover openings 141c and 141d of the fourth case portion 14 described later are provided in the fourth case portion 14. As shown in FIGS. 3 and 4, the third case portion 13 and the first lid 15 are fastened to each other with screw members 44 to be coupled to each other. The fourth case portion 14 and the second lids 16 are fastened to each other with screw members 45 to be coupled to each other.

As shown in FIGS. 3 and 4, portions of the first case portion 11, the fourth case portion 14, the second case portion 12, and the third case portion 13 coupled to each other, a portion between the third case portion 13 and the first lid 15, and portions between the fourth case portion 14 and the second lids 16 (see shaded areas in FIGS. 3 and 4) are sealed with sealing members 50 formed by applying a liquid sealing agent having a waterproof function and drying the same.

The detailed configuration (structure) of the first case portion 11 housing the motor 3 (see FIG. 1) of the motor drive portion 10 according to the embodiment is now described with reference to FIGS. 5 to 8.

Figure 7:
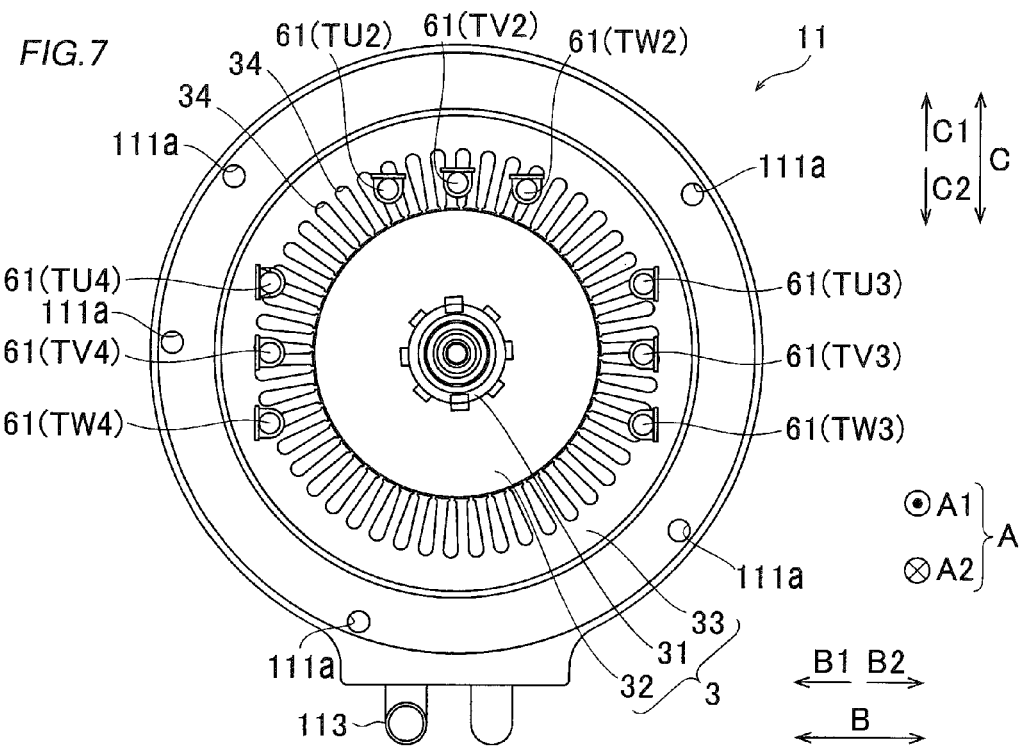
FIG. 7 is a plan view of the first case portion shown in FIGS. 5 and 6 as viewed from a side along arrow A1.
Figure 8:
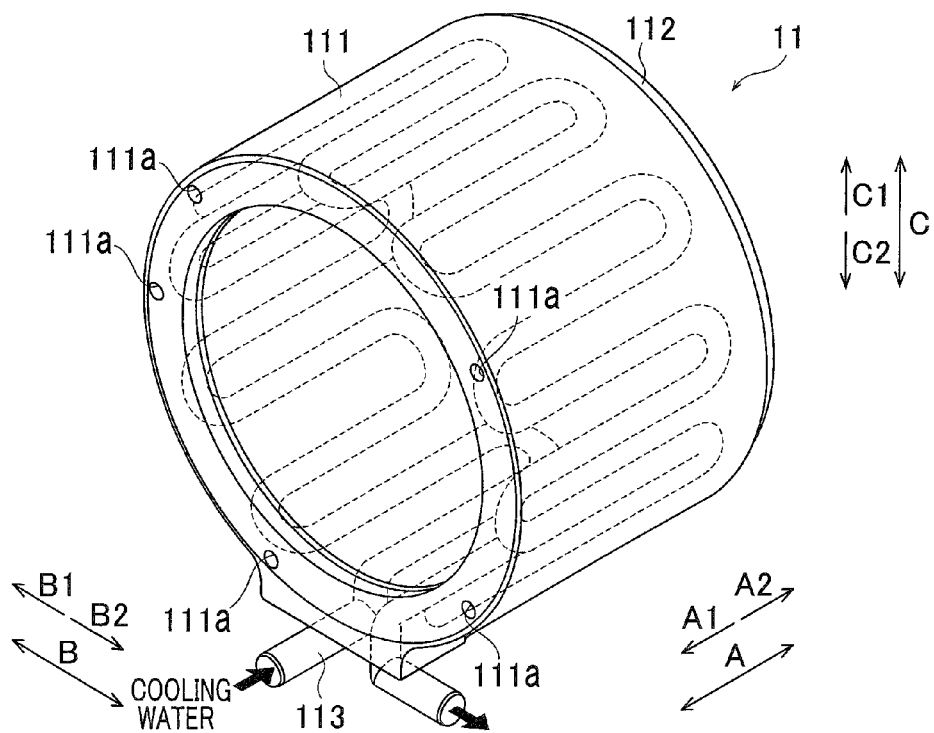
FIG. 8 is a perspective view for illustrating a first cooling pipe provided inside the first case portion shown in FIG. 5.

As shown in FIGS. 5 to 8, the first case portion 11 has a side surface portion 111 in a cylindrical shape extending in the direction $\underline{A}$ (the axial direction of the motor 3) and a bottom surface portion 112 provided on an end of the side surface portion 111 along arrow A2. As shown in FIGS. 5, 7, and 8, screw holes 111a into which the hexagon socket screws 41 (see FIGS. 3 and 4) configured to screw the first case portion 11 and the fourth case portion 14 to each other are screwed are provided in the side surface portion 111. The screw holes 111a are provided to extend along arrow A2 from an end face of the side surface portion 111 along arrow A1. As shown in FIG. 7, a plurality of (five in this embodiment) screw holes 111a are provided at intervals along a circumferential direction to correspond to a plurality of (five in this embodiment) screw insertion holes 141a (see FIG. 23) provided in a side surface portion 141 of the fourth case portion 14 described later, as viewed in the axial direction of the motor 3. A breather valve (not shown) configured to suppress damage of the first case portion 11 resulting from excessively increased pressure when pressure in the first case portion 11 is excessively increased due to an increase in temperature or the like is provided in the side surface portion 111.

As shown in FIGS. 5 to 8, the motor 3 housed in the first case portion includes the rotating shaft 31, a rotor core 32, and a stator core 33. The rotating shaft 31 is provided to pass through the bottom surface portion 112 in the vicinity of a central portion of the motor 3 and extend in the direction $\underline{A}$. The rotor core 32 is provided to surround the rotating shaft 31. The stator core 33 is arranged to be opposed to the outer periphery of the rotor core 32. A plurality of slots 34 are provided on the inner peripheral side of the stator core 33. The winding 3a for high-speed drive and the winding 3b for low-speed drive (see FIG. 1) are wound by lap winding or the like and are housed in the plurality of slots 34.

As shown in FIGS. 5 and 7, the motor 3 housed in the first case portion 11 is connected with nine connection wires 62 having nine connection terminal portions 61 corresponding to the terminals TU2, TV2, TW2, TU3, TV3, TW3, TU4, TV4, and TW4 (see FIG. 1) of the windings 3a and 3b. These nine connection wires 62 are provided to protrude from an end face of the first case portion 11 along arrow A1 and extend in the direction $\underline{A}$.

According to this embodiment, a first cooling pipe 113 into which liquid coolant for cooling the motor 3 flows is provided in the first case portion 11, as shown in FIG. 8. A first end (an end on a side from which the liquid coolant flows in) and a second end (an end on a side of which the liquid coolant flows out) of this first cooling pipe 113 are provided to protrude outward from a surface along arrow C2 in the vicinity of an end of the side surface portion 111 along arrow A1. The first cooling pipe 113 is an example of the "first cooling portion".

The first cooling pipe 113 is provided over the entire inner portion of the side surface portion 111 to circumferentially surround a space (a space in which the motor 3 is housed) inside the side surface portion 111. Specifically, the first cooling pipe 113 is formed to have a plurality of linear portions extending from the vicinity of the end along arrow A1 to the vicinity of an end along arrow A2 in the direction $\underline{A}$ inside the side surface portion 111. The plurality of linear portions extending in the direction $\underline{A}$ are alternately bent in a U shape at the end along arrow A1 and the end along arrow A2 to be connected to each other. Thus, a series of flow paths into which the liquid coolant flows is formed from the first end of the first cooling pipe 113 to the second end thereof.

The detailed configuration (structure) of the second case portion 12 housing the inverter portion 1 and the winding switching portion 4 (see FIG. 1) of the motor drive portion 10 according to the embodiment is now described with reference to FIGS. 9 to 14 and 24.

Figure 9:
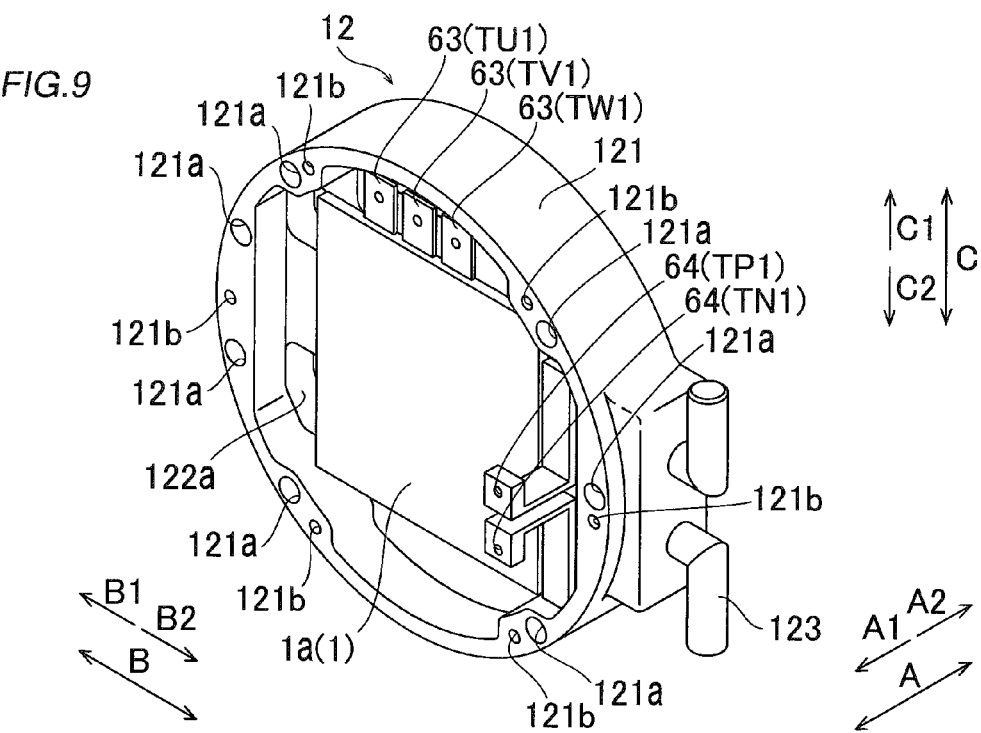
FIG. 9 is a perspective view showing a second case portion of the motor drive portion shown in FIG. 3.
Figure 10:
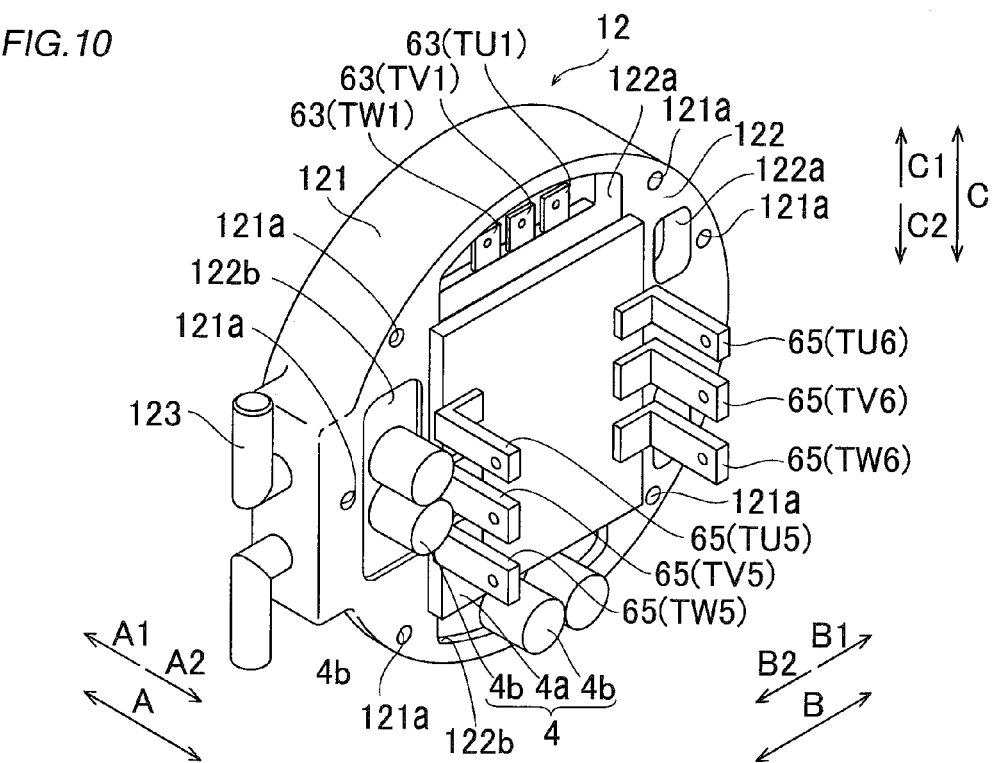
FIG. 10 is a perspective view of the second case portion shown in FIG. 9 as viewed from a side opposite to a side shown in FIG. 9.
Figure 13:
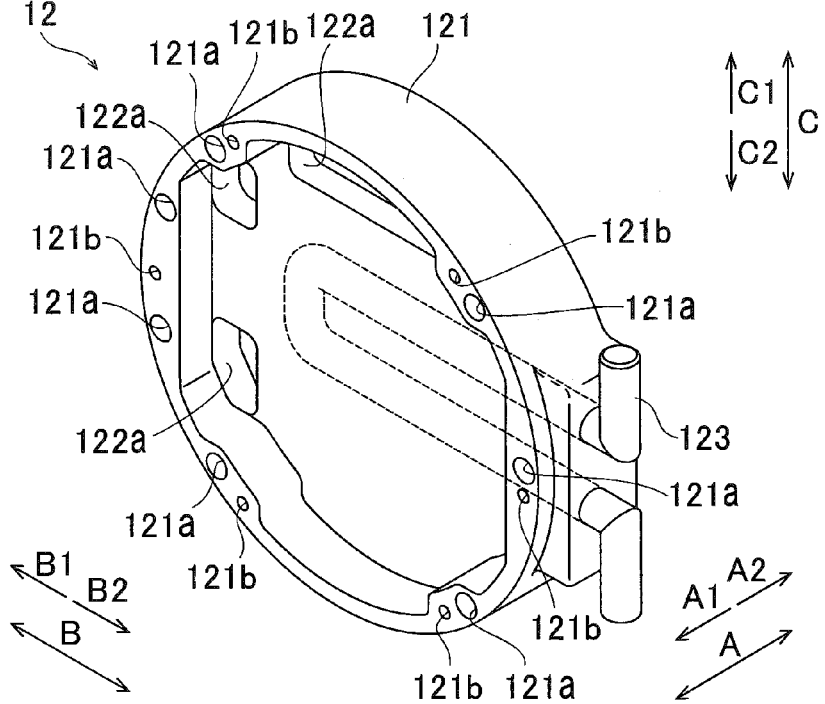
FIG. 13 is a perspective view showing the state of the second case portion shown in FIG. 9 from which an inverter module is removed.
Figure 14:
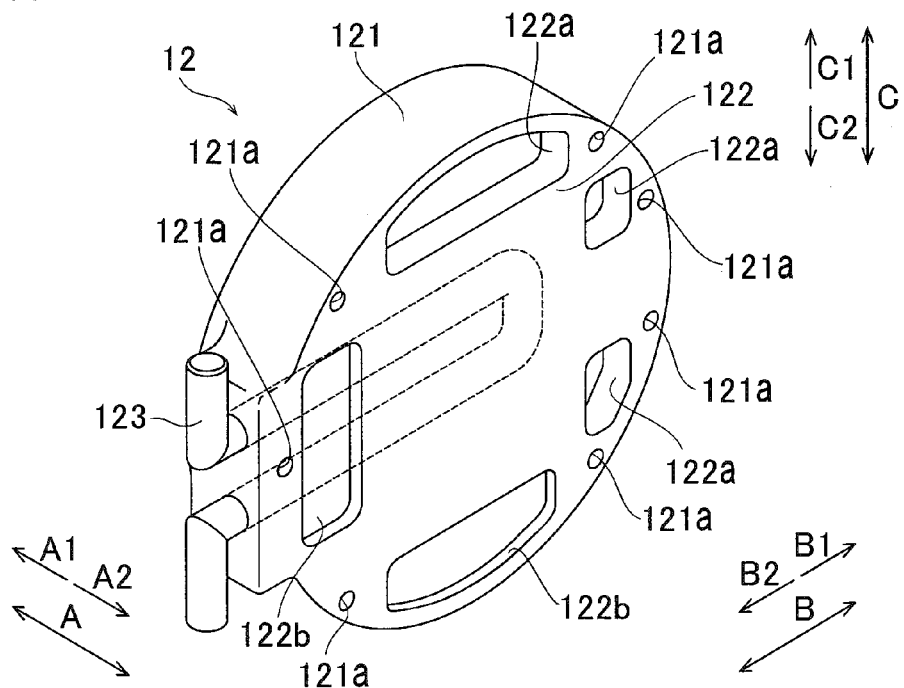
FIG. 14 is a perspective view showing the state of the second case portion shown in FIG. 10 from which a winding switching module and a capacitor module are removed.

As shown in FIGS. 9 to 14, the second case portion 12 has a side surface portion 121 in a cylindrical shape extending in the direction $\underline{A}$ (the axial direction of the motor 3) and a disc-shaped first partition wall 122 extending along a plane orthogonal to the direction $\underline{A}$ (along a direction B and a direction C). As shown in FIGS. 10 and 14, the first partition wall 122 is arranged on an end of the side surface portion 121 along arrow A2.

As shown in FIGS. 9 to 14, screw insertion holes 121a into which the hexagon socket screws 42 (see FIGS. 3 and 4) configured to screw the second case portion 12 and the fourth case portion 14 to each other are inserted are provided in the side surface portion 121. The screw insertion holes 121a are provided to pass through the side surface portion 121 in the direction $\underline{A}$. As shown in FIG. 11, a plurality of (seven in this embodiment) screw insertion holes 121a are provided at intervals along the circumferential direction to correspond to a plurality of (seven in this embodiment) screw holes 141b (see FIG. 23) provided in the side surface portion 141 of the fourth case portion 14 described later, as viewed in the axial direction of the motor 3.

As shown in FIGS. 9, 11, and 13, screw holes 121b into which the hexagon socket screws 43 (see FIGS. 3 and 4) configured to screw the second case portion 12 and the third case portion 13 to each other are screwed are provided in the side surface portion 121. The screw holes 121b are provided to extend along arrow A2 from an end face of the side surface portion 121 along arrow A1. As shown in FIG. 11, a plurality of (six in this embodiment) screw holes 121b are provided at intervals along the circumferential direction to correspond to a plurality of (six in this embodiment) screw insertion holes 131a (see FIGS. 17 and 18) provided in a side surface portion 131 of the third case portion 13 described later, as viewed in the axial direction of the motor 3.

A breather valve (not shown) configured to suppress damage of the second case portion 12 and electronic components placed therein resulting from excessively increased pressure when pressure in the second case portion 12 is excessively increased due to an increase in temperature or the like is provided in the side surface portion 121.

The first partition wall 122 is provided to isolate the winding switching portion 4 and the inverter portion 1 from each other in the second case portion 12. Specifically, the inverter portion 1 is formed by arranging an inverter module 1a mounted with the electronic component including the switch elements Q1 to Q6 (see FIG. 1) in a wiring substrate on a surface of the first partition wall 122 along arrow A1, as shown in FIGS. 9 and 11. As shown in FIGS. 10 and 12, the winding switching portion 4 is formed by arranging a winding switching module 4a mounted with the electronic component including the high-speed winding switch SW1 and the low-speed winding switch SW2 (see FIG. 1) in a wiring substrate and two capacitor modules 4b on a surface of the first partition wall 122 along arrow A2. Thus, the inverter portion 1 is arranged in a region opposite to (along arrow A1) the motor 3 with respect to the first partition wall 122 of the second case portion 12. The winding switching portion 4 is arranged in a region opposite to (along arrow A2) the inverter portion 1 with respect to the first partition wall 122 of the second case portion 12. According to this embodiment, an insulating heat radiation sheet may be provided in a portion between the switch elements Q1 to Q6 of the inverter module 1a and the surface of the first partition wall 122 along arrow A1.

As shown in FIGS. 9 and 11, three plate-like connection terminal portions 63 corresponding to the terminals TU1, TV1, and TW1 (see FIG. 1) of the inverter portion 1 are provided in the inverter module 1a. These three connection terminal portions 63 are provided to protrude from an end face of the inverter module 1a along arrow C1. A pair of connection terminal portions 64 corresponding to the terminals TP1 and TN1 (see FIG. 1) of the inverter portion 1 are arranged adjacent to the inverter module 1a on the surface of the first partition wall 122 along arrow A1.

Figure 24:
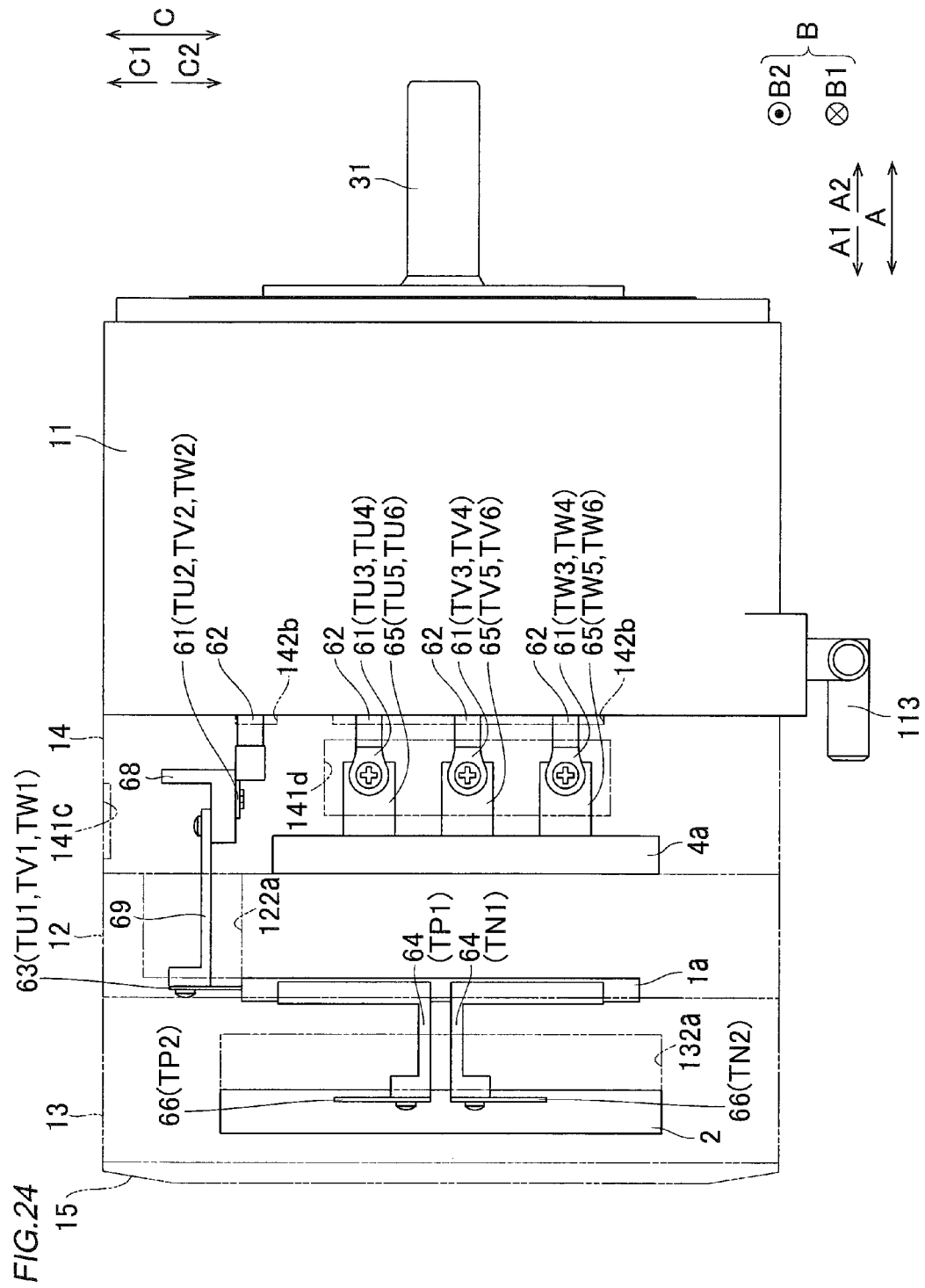
FIG. 24 is a perspective view for illustrating the connection relationship between internal portions of the motor drive portion shown in FIG. 2.

As shown in FIGS. 9 and 24, the connection terminal portions 64 each have a portion extending in the axial direction (direction A) and are formed in a U shape such that a first end side and a second end side thereof extend in the direction C. As shown in FIG. 9, portions (long portions extending in the direction C on a side along arrow A2) of the connection terminal portions 64 on the first end side are arranged on the surface of the first partition wall 122 along arrow A1. As shown in FIG. 24, portions (short portions extending in the direction C on the side along arrow A1) of the connection terminal portions 64 on the second end side are configured to be electrically connected to plate-like connection terminal portions 66, described later, of the smoothing capacitor 2 housed in the third case portion 13 by screws.

As shown in FIGS. 10 and 12, six connection terminal portions 65 corresponding to the terminals TU5, TV5, TW5, TU6, TV6, and TW6 (see FIG. 1) of the winding switching portion 4 are provided in the winding switching module 4a. Three of these six connection terminal portions 65 are arranged on the side along arrow B1 of a surface along arrow A2 of the winding switching module 4a, and the remaining three are arranged on the side along arrow B2 of the surface along arrow A2 of the winding switching module 4a.

As shown in FIG. 10, the connection terminal portions 65 each are formed in an L shape having a portion extending in the direction A and a portion extending in the direction B. These portions of the connection terminal portions 65 extending in the direction B are arranged on a surface of the winding switching module 4a along arrow A2. As shown in FIG. 24, the portions of the connection terminal portions 65 extending in the direction A are configured to be electrically connected to the connection terminal portions 61 corresponding to the terminals TU3, TV3, TW3, TU4, TV4, and TW4 (see FIG. 1) of the motor 3 by screws.

According to this embodiment, a second cooling pipe 123 configured to cool the inverter module 1a (inverter portion 1) and the winding switching module 4a (winding switching portion 4) arranged on the surfaces of the first partition wall 122 is provided in the second case portion 12, as shown in FIGS. 9 to 14. A first end (an end on a side from which the liquid coolant flows in) and a second end (an end on a side of which the liquid coolant flows out) of this second cooling pipe 123 are provided to protrude outward from a surface along arrow B2 in the vicinity of a central portion of the side surface portion 121 in the direction C. The second cooling pipe 123 is an example of the "second cooling portion".

As shown in FIGS. 11 to 14, the second cooling pipe 123 is formed to have a U-shaped portion extending from an end along arrow B2 to the vicinity of an end along arrow B1 inside the first partition wall 122. Thus, a series of flow paths into which the liquid coolant flows is formed from the first end of the second cooling pipe 123 to the second end thereof. As shown in FIG. 2, the first end of the second cooling pipe 123 of the second case portion and the second end of the first cooling pipe 113 of the first case portion 11 are connected to each other through a coupling portion 70 including a tube or the like.

As shown in FIG. 11, the second cooling pipe 123 is provided to overlap with the switch elements Q1 to Q6 (see FIG. 1) of the inverter portion 1 mounted in the inverter module 1a, as viewed in the axial direction of the motor 3. As shown in FIG. 12, the second cooling pipe 123 is provided to overlap with the high-speed winding switch SW1 and the low-speed winding switch SW2 of the winding switching portion 4 mounted in the winding switching module 4a, as viewed in the axial direction of the motor 3. In FIG. 11, the switch elements Q1 to Q6 each are illustrated in a rectangular shape shown by a one-dot chain line. In FIG. 12, the high-speed winding switch SW1 and the low-speed winding switch SW2 each are illustrated in a rectangular shape shown by a two-dot chain line.

As shown in FIGS. 11 and 12, three first holes 122a configured to allow wires connected to the inverter portion 1 of the inverter module 1a and the winding switching portion 4 of the winding switching module 4a to pass through are provided in the first partition wall 122. For example, one first hole 122a provided in the vicinity of an end of the first partition wall 122 along arrow C1 is provided to allow connection terminal portions 69 (see FIG. 24), described later, connected to the connection terminal portion 63 of the inverter portion 1 to pass through when the first case portion 11, the fourth case portion 14, and the second case portion 12 are coupled to each other. Two first holes 122a provided in the vicinity of an end of the first partition wall 122 along arrow B1 are provided to allow wires (not shown) or the like configured to transmit the control signals from the control portion 5 to the inverter portion 1 and the winding switching portion 4 to pass through.

As shown in FIGS. 10, 12, and 14, two recess portions 122b are provided in the surface of the first partition wall 122 along arrow A2. The two capacitor modules 4b corresponding to the capacitors C1 and C2 (see FIG. 1) connected to the high-speed winding switch SW1 and the low-speed winding switch SW2 of the winding switching portion 4 are arranged in these two recess portions 122b.

The detailed configuration (structure) of the third case portion 13 housing the smoothing capacitor 2, the control portion 5, and the power supply portion 6 (see FIG. 1) of the motor drive portion 10 according to the embodiment is now described with reference to FIGS. 15 to 20 and 24.

Figure 17:
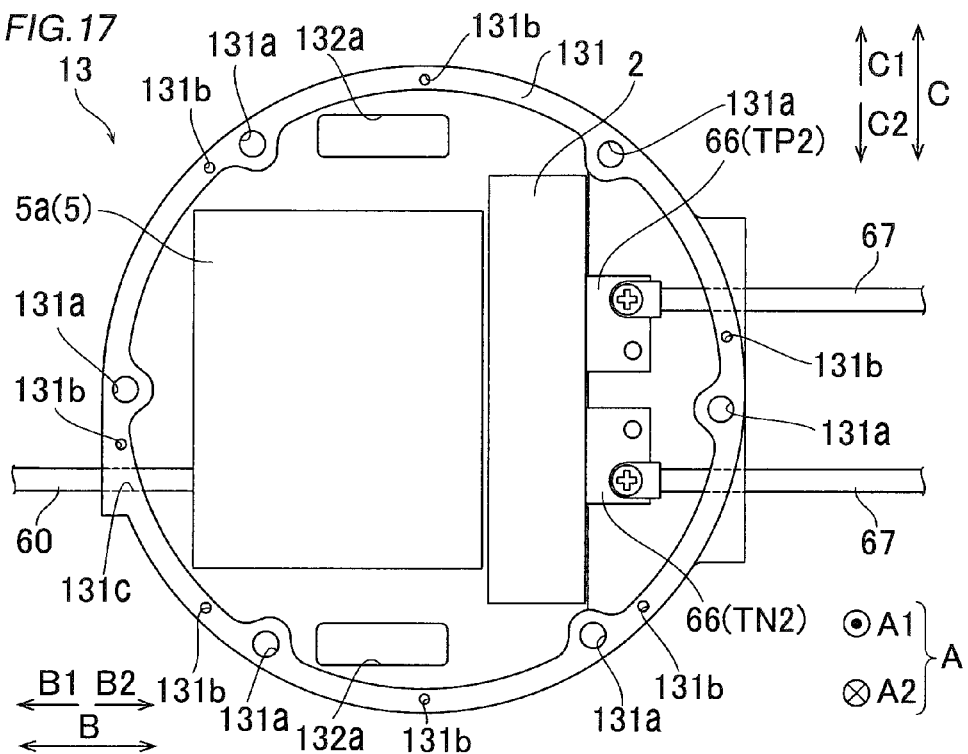
FIG. 17 is a plan view of the third case portion shown in FIGS. 15 and 16 as viewed from the side along arrow A1.
Figure 18:
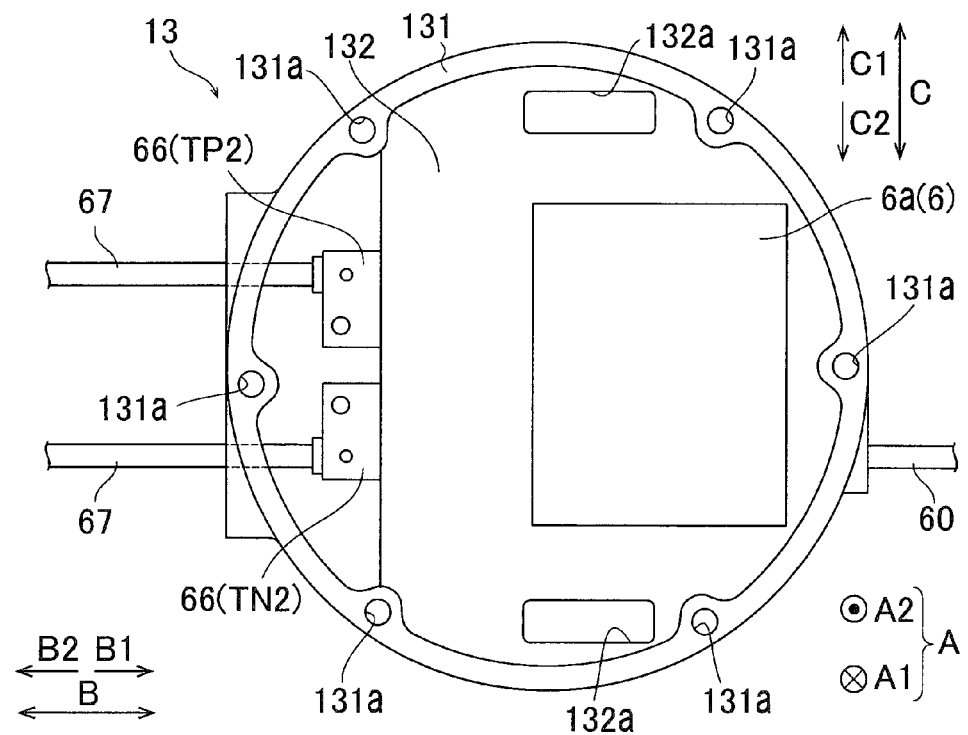
FIG. 18 is a plan view of the third case portion shown in FIGS. 15 and 16 as viewed from the side along arrow A2.
Figure 19:
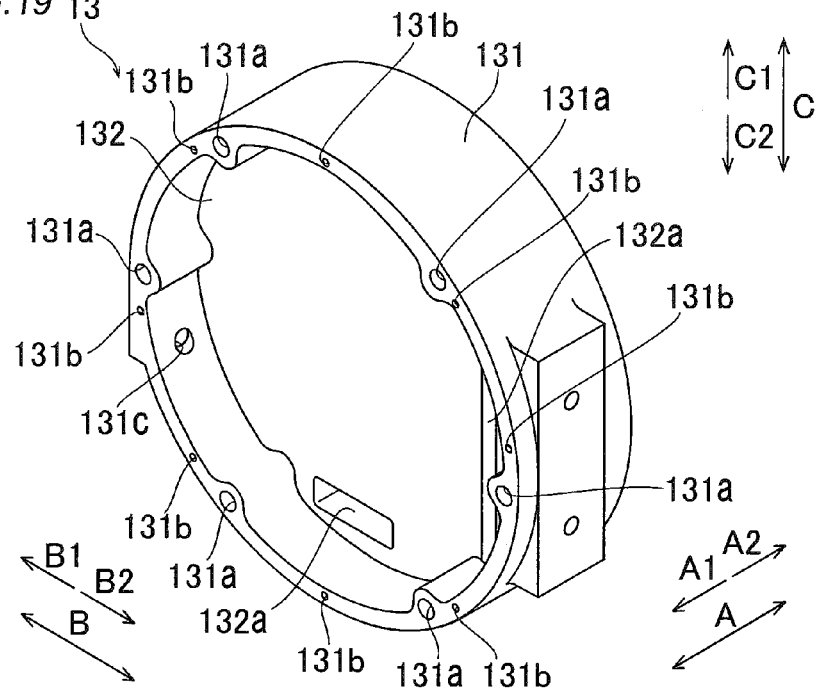
FIG. 19 is a perspective view showing the state of the third case portion shown in FIG. 15 from which a control board and a smoothing capacitor are removed.
Figure 20:
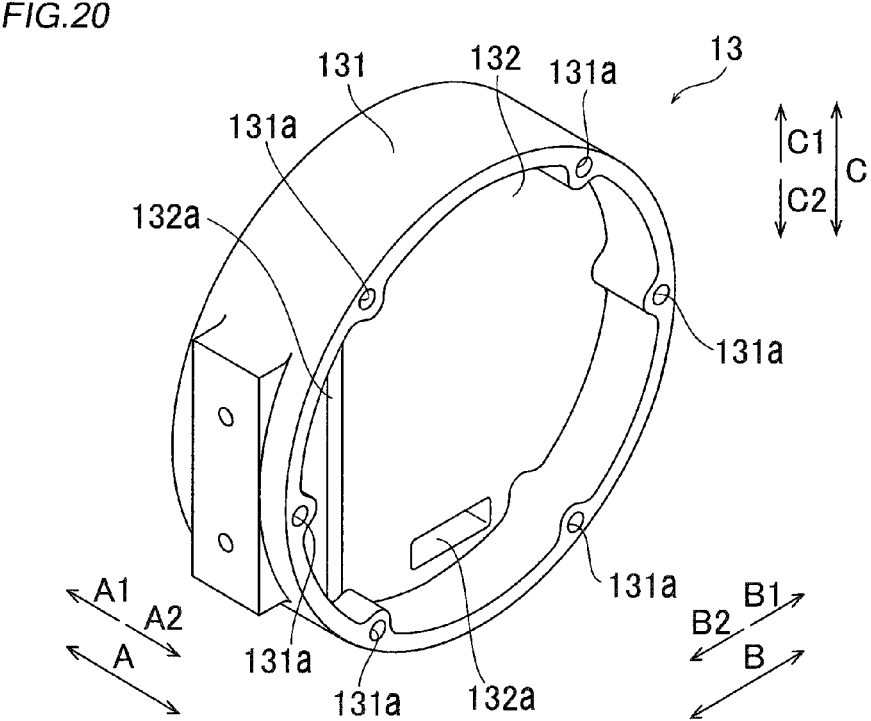
FIG. 20 is a perspective view showing the state of the third case portion shown in FIG. 16 from which a power supply board is removed.

As shown in FIGS. 15 to 20, the third case portion 13 has the side surface portion 131 in a cylindrical shape extending in the direction A (the axial direction of the motor 3) and a disc-shaped second partition wall 132 extending along the plane orthogonal to the direction A (along the direction B and the direction C). As shown in FIGS. 19 and 20, the second partition wall 132 planarly extends in the direction B and the direction C inside the side surface portion 131.

Figure 15:
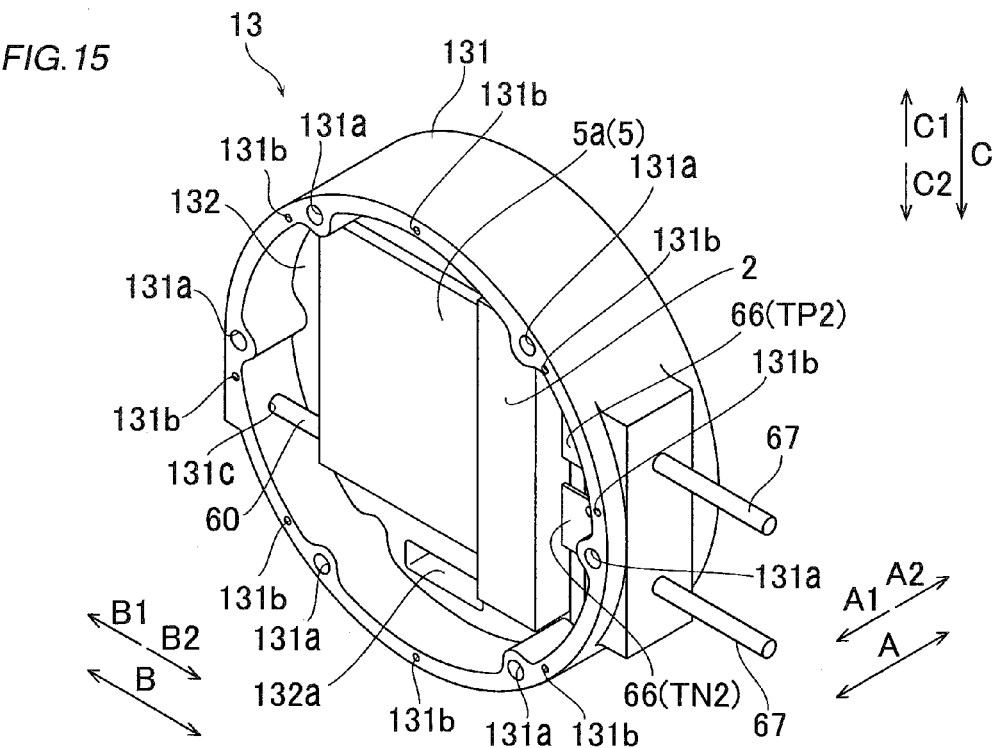
FIG. 15 is a perspective view showing a third case portion of the motor drive portion shown in FIG. 3.
Figure 16:
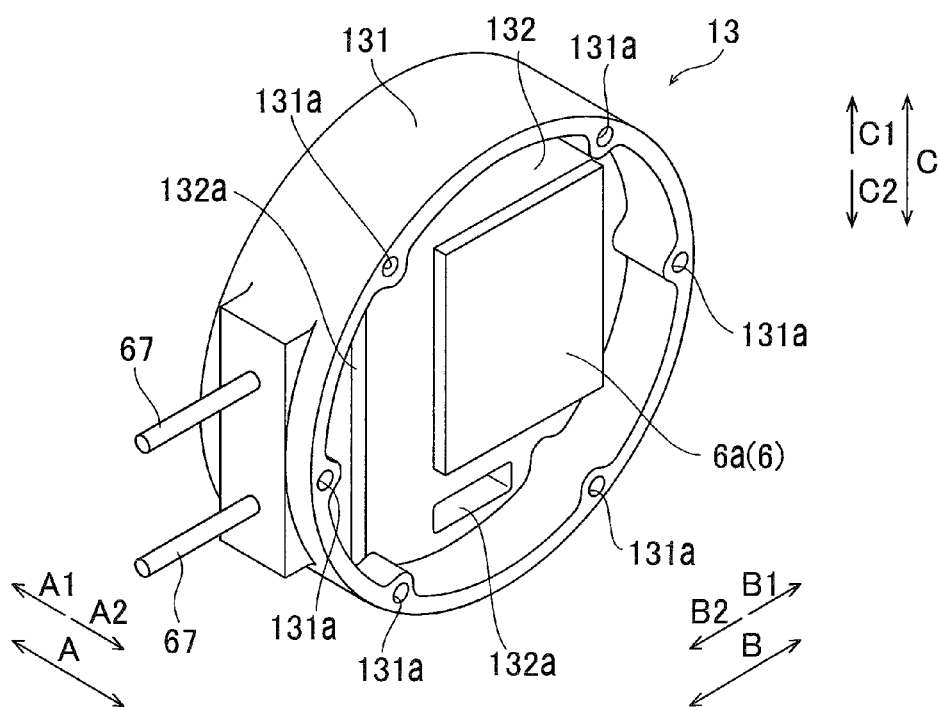
FIG. 16 is a perspective view of the third case portion shown in FIG. 15 as viewed from a side opposite to a side shown in FIG. 15.

As shown in FIGS. 15 to 20, the screw insertion holes 131a into which the hexagon socket screws 43 (see FIGS. 3 and 4) configured to screw the third case portion 13 and the second case portion 12 to each other are inserted are provided in the side surface portion 131. The screw insertion holes 131a are provided to pass through the side surface portion 131 in the direction A. As shown in FIGS. 17 and 18, a plurality of (six in this embodiment) screw insertion holes 131a are provided at intervals along the circumferential direction to correspond to the plurality of (six in this embodiment) screw holes 121b (see FIG. 11) provided in the side surface portion 121 of the second case portion 12, as viewed in the axial direction of the motor 3.

As shown in FIGS. 15, 17, and 19, screw holes 131b into which the screw members 44 (see FIGS. 3 and 4) configured to screw the third case portion 13 and the first lid 15 to each other are screwed are provided in the side surface portion 131. These screw holes 131b are provided to extend along arrow A2 from an end face of the side surface portion 131 along arrow A1. As shown in FIG. 17, a plurality of (eight in this embodiment) screw holes 131b are provided at intervals along the circumferential direction to correspond to a plurality of (eight in this embodiment) screw insertion holes 15a (see FIGS. 3 and 4) provided in the first lid 15, as viewed in the axial direction of the motor 3.

As shown in FIGS. 15, 17, and 19, a through-hole 131c configured to allow a connection wire 60 connecting a control board 5a described later, arranged in the third case portion 13 and a control portion (now shown) for the entire vehicle 100 provided outside the motor drive portion 10 to each other to pass through is provided in the side surface portion 131. A portion of the side surface portion 131 of the third case portion 13 through which the connection wire 60 passes is sealed with a sealing agent.

A breather valve (not shown) configured to suppress damage of the third case portion 13 and electronic components placed therein resulting from excessively increased pressure when pressure in the third case portion 13 is excessively increased due to an increase in temperature or the like is provided in the side surface portion 131.

The second partition wall 132 is provided to isolate the smoothing capacitor 2 and the control portion 5 from the power supply portion 6 in the third case portion 13. Specifically, the smoothing capacitor 2 provided with a film capacitor or an electrolytic capacitor therein and the control board 5a mounted with the control portion 5 are arranged adjacent to each other in the direction B on a surface of the second partition wall 132 along arrow A1, as shown in FIGS. 15 and 17. As shown in FIGS. 16 and 18, a power supply board 6a mounted with the power supply portion 6 is arranged on a surface of the second partition wall 132 along arrow A2. Thus, the smoothing capacitor 2 and the control portion 5 are arranged in a region opposite to (along arrow A1) the motor 3, the winding switching portion 4, and the inverter portion 1 with respect to the second partition wall 132 of the third case portion 13. The power supply portion 6 is arranged in a region opposite to (along arrow A2) the smoothing capacitor 2 and the control portion 5 with respect to the second partition wall 132 of the third case portion 13.

As shown in FIGS. 15 and 17, the two plate-like connection terminal portions 66 corresponding to the terminals TP2 and TN2 (see FIG. 1) are provided in the smoothing capacitor 2. These two connection terminal portions 66 are provided to protrude from a surface of the rectangular parallelepiped smoothing capacitor 2 along arrow B2. The connection terminal portions 66 are configured to be electrically connected to portions (short-side portions extending in the direction B on the side along arrow A2) of the pair of connection terminal portions 64 on the second end side corresponding to the terminals TP1 and TN1 (see FIG. 1) of the inverter portion 1 by screws, as shown in FIG. 24. As shown in FIGS. 15 and 17, connection wires 67 connected to the battery portion 20 (see FIG. 1) are screwed to the connection terminal portions 66. These two connection wires 67 are provided to pass through portions of the side surface portion 131 of the third case portion 13 on a side along arrow B2 in the vicinity of a central portion of the side surface portion 131 in the direction C and extend in the direction B. The portions of the side surface portion 131 of the third case portion 13 through which the connection wires 67 pass are sealed with a sealing agent.

According to this embodiment, three second holes 132a configured to allow wires connected to the control portion 5 mounted on the control board 5a and the power supply portion 6 mounted on the power supply board 6a to pass through are provided in the second partition wall 132 of the third case portion 13, as shown in FIGS. 15 to 20. For example, one second hole 132a provided in the vicinity of an end of the second partition wall 132 along arrow B2 is provided to allow the pair of connection terminal portions 64 corresponding to the terminals TP1 and TN1 (see FIG. 1) of the inverter portion 1 to pass through when the second case portion 12 and the third case portion 13 are coupled to each other, as shown in FIG. 24. Two second holes 132a provided in the vicinity of both ends of the second partition wall 132 in the direction C are provided to allow wires (not shown) or the like configured to transmit the control signals from the control portion 5 to pass through.

The detailed configuration (structure) of the fourth case portion 14 of the motor drive portion 10 according to the embodiment is now described with reference to FIGS. 21 to 24.

Figure 21:
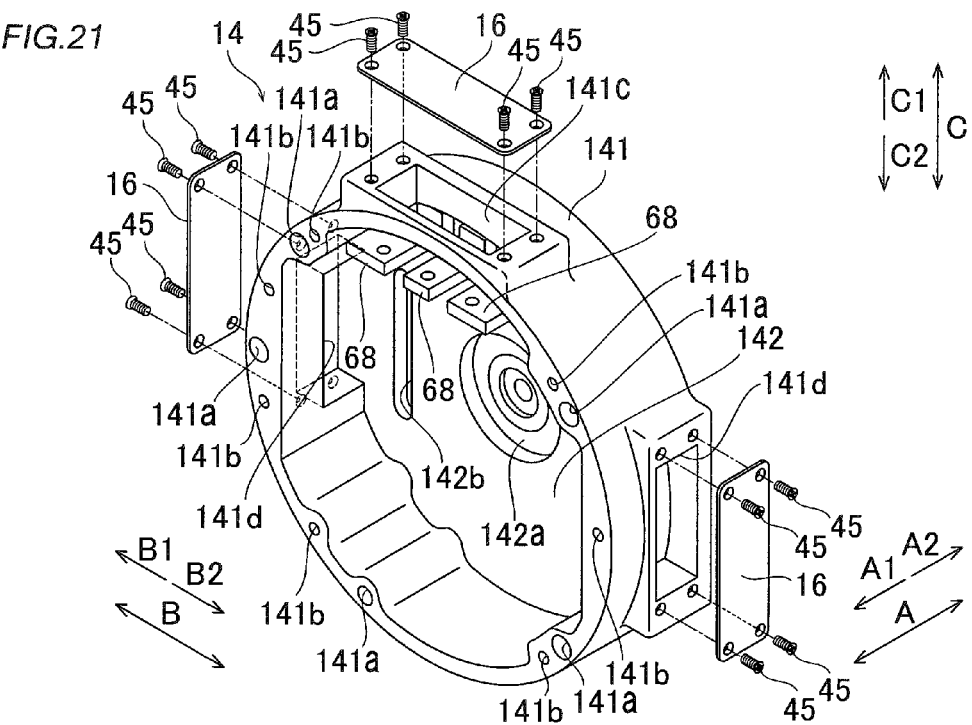
FIG. 21 is a perspective view showing a fourth case portion of the motor drive portion shown in FIG. 3.
Figure 22:
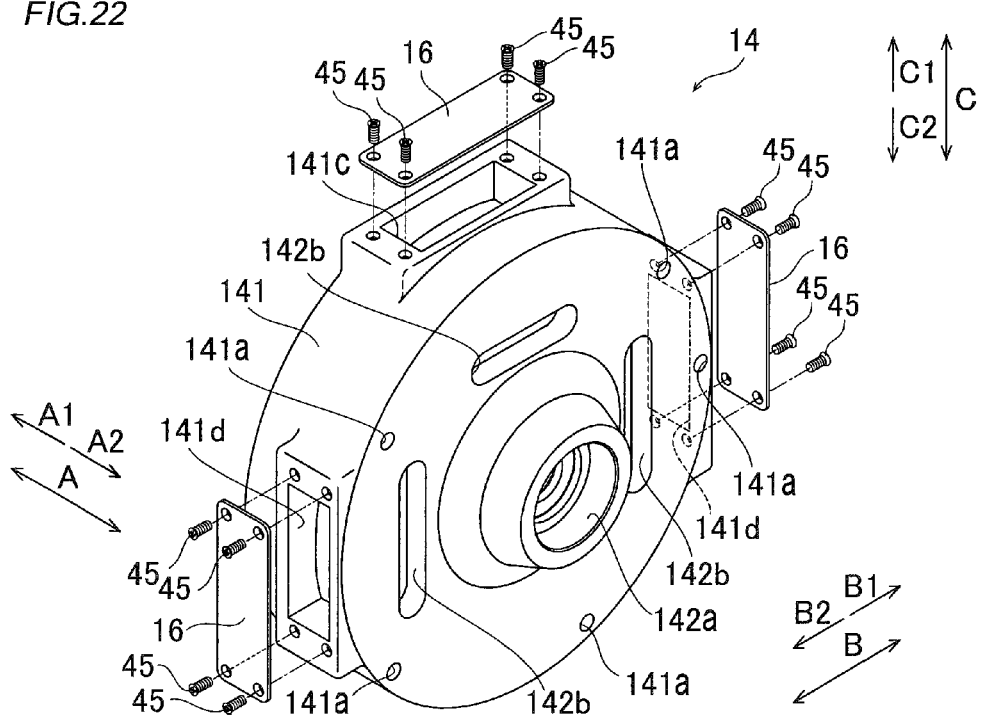
FIG. 22 is a perspective view of the fourth case portion shown in FIG. 21 as viewed from a side opposite to a side shown in FIG. 21.
Figure 23:
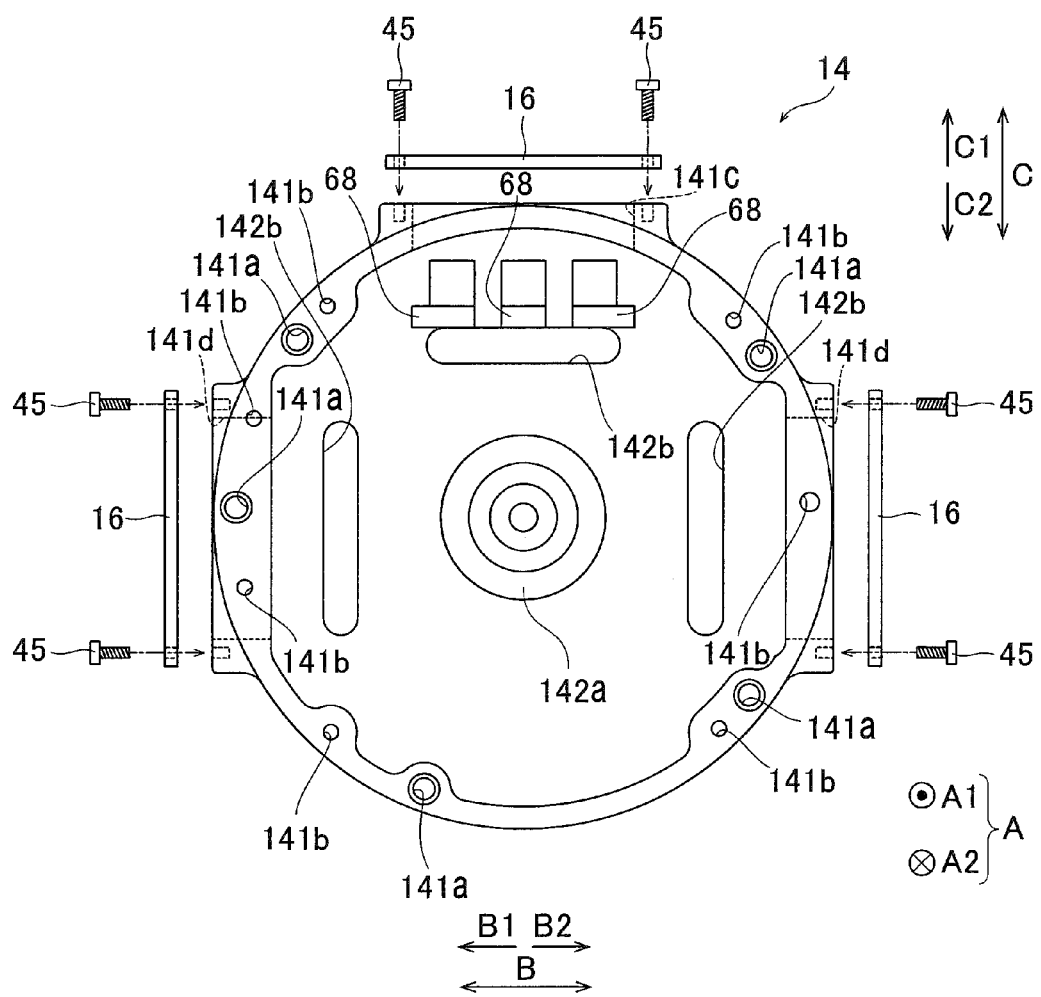
FIG. 23 is a plan view of the fourth case portion shown in FIGS. 21 and 22 as viewed from the side along arrow A1.

As shown in FIGS. 21 to 24, the fourth case portion 14 has the side surface portion 141 in a cylindrical shape extending in the direction A (the axial direction of the motor 3) and a bottom surface portion 142 provided on an end of the side surface portion 141 along arrow A2. As shown in FIGS. 21 to 23, a bearing 142a connected to an end (see FIG. 5) along arrow A1 of the rotating shaft 31 of the motor 3 housed in the first case portion 11 is provided in a central portion of the bottom surface portion 142.

As shown in FIGS. 21 to 23, the screw insertion holes 141a into which the hexagon socket screws 41 (see FIGS. 3 and 4) configured to screw the fourth case portion 14 and the first case portion 11 to each other are inserted are provided in the side surface portion 141. The screw insertion holes 141a are provided to pass through the side surface portion 141 in the direction A. As shown in FIG. 23, the plurality of (five in this embodiment) screw insertion holes 141a are provided at intervals along the circumferential direction to correspond to the plurality of (five in this embodiment) screw holes 111a (see FIG. 7) provided in the side surface portion 111 of the first case portion 11, as viewed in the axial direction of the motor 3.

As shown in FIGS. 21 and 23, the screw holes 141b into which the hexagon socket screws 42 (see FIGS. 3 and 4) configured to screw the fourth case portion 14 and the second case portion 12 to each other are screwed are provided in the side surface portion 141. These screw holes 141b are provided to extend along arrow A2 from an end face of the side surface portion 141 along arrow A1. As shown in FIG. 23, the plurality of (seven in this embodiment) screw holes 141b are provided at intervals along the circumferential direction to correspond to the plurality of (seven in this embodiment) screw insertion holes 121a (see FIG. 11) provided in the side surface portion 121 of the second case portion 12, as viewed in the axial direction of the motor 3.

A breather valve (not shown) configured to suppress damage of the fourth case portion 14 resulting from excessively increased pressure when pressure in the fourth case portion 14 is excessively increased due to an increase in temperature or the like is provided in the side surface portion 141.

According to this embodiment, L-shaped connection terminal portions 68 each having a portion extending in the direction A and a portion extending in the direction C are provided in the fourth case portion 14, as shown in FIGS. 21, 23, and 24. As shown in FIGS. 21 and 23, the portions of the connection terminal portions 68 extending in the direction C are mounted on a surface along arrow A1 of the bottom surface portion 142 of the fourth case portion 14 through insulating members (not shown) made of resin.

As shown in FIG. 24, the portions of the connection terminal portions 68 extending in the direction A are configured to be electrically connected to the three connection terminal portions 61 corresponding to the terminals TU2, TV2, TW2 (see FIG. 1) of the motor 3 by screws when the first case portion 11 and the fourth case portion 14 are coupled to each other. The portions of the connection terminal portions 68 extending in the direction A are configured to be electrically connected to the connection terminal portions 63 corresponding to the terminals TU1, TV1, and TW1 (see FIG. 1) of the inverter portion 1 of the second case portion 12 through the connection terminal portions 69 by being screwed to the L-shaped connection terminal portions 69 when the first case portion 11, the fourth case portion 14, and the second case portion 12 are coupled to each other. Thus, according to this embodiment, the connection terminal portions 61, 68, and 69 configured to electrically connect the motor 3 and the inverter portion 1 to each other when the first case portion 11, the fourth case portion 14, and the second case portion 12 are coupled to each other are housed in the fourth case portion 14.

According to this embodiment, the six connection terminal portions 61 corresponding to the terminals TU3, TV3, TW3, TU4, TV4, and TW4 (see FIG. 1) of the motor 3 and the six connection terminal portions 65 corresponding to the terminals TU5, TV5, TW5, TU6, TV6, and TW6 (see FIG. 1) of the winding switching portion 4 are housed in the fourth case portion 14 in a state where the six connection terminal portions 61 and the six connection terminal portions 65 are screwed to each other when the first case portion 11, the fourth case portion 14, and the second case portion 12 are coupled to each other, as shown in FIG. 24. In other words, according to this embodiment, the connection terminal portions 61 and 65 configured to electrically connect the motor 3 and the winding switching portion 4 to each other are housed in the fourth case portion 14 when the first case portion 11, the fourth case portion 14, and the second case portion 12 are coupled to each other.

According to this embodiment, the rectangular openings 141c and 141d are provided in the side surface portion 141 of the fourth case portion 14, as shown in FIGS. 21 and 22. One opening 141c is provided in a portion of the side surface portion 141 on a side along arrow C1 in the vicinity of a central portion of the side surface portion 141 in the direction B. One opening 141d is provided in each of portions of the side surface portion 141 on sides along arrow B1 and arrow B2 in the vicinity of a central portion of the side surface portion 141 in the direction C. The three plate-like second lids 16 are mounted on the side surface portion 141 of the fourth case portion 14 to cover the openings 141c and 141d. These second lids 16 are configured to be fastened to the side surface portion 141 with the screw members 45.

As shown in FIG. 24, the opening 141c is provided in a portion corresponding to the connection terminal portions 68 and 69 housed in the fourth case portion 14 when the fourth case portion 14 and the second case portion 12 are coupled to each other. Thus, the connection terminal portions 69 connected to the connection terminal portions 63 corresponding to the terminals TU1, TV1, and TW1 (see FIG. 1) of the inverter portion 1 of the second case portion 12 and the connection terminal portions 68 in the fourth case portion 14 can be screwed to each other through the opening 141c outside the fourth case portion 14 when the fourth case portion 14 and the second case portion 12 are coupled to each other.

As shown in FIG. 24, the openings 141d are provided in portions corresponding to the connection terminal portions 61 and 65 housed in the fourth case portion 14 when the first case portion 11, the fourth case portion 14, and the second case portion 12 are coupled to each other. Thus, the six connection terminal portions 61 corresponding to the terminals TU3, TV3, TW3, TU4, TV4, and TW4 (see FIG. 1) of the motor 3 and the six connection terminal portions 65 corresponding to the terminals TU5, TV5, TW5, TU6, TV6, and TW6 (see FIG. 1) of the winding switching portion 4 can be screwed to each other through the openings 141d outside the fourth case portion 14 when the first case portion 11, the fourth case portion 14, and the second case portion 12 are coupled to each other.

According to this embodiment, three third holes 142b configured to allow the three connection terminal portions 61 corresponding to the terminals TU2, TV2, and TW2 (see FIG. 1) of the motor 3 and the six connection terminal portions 61 corresponding to the terminals TU3, TV3, TW3, TU4, TV4, and TW4 (see FIG. 1) of the motor 3 to pass through when the fourth case portion 14 and the first case portion 11 are coupled to each other are provided in the bottom surface portion 142, as shown in FIGS. 23 and 24.

A procedure for assembling the motor drive portion 10 according to the embodiment is now described with reference to FIGS. 2 to 4 and 24.

As shown in FIGS. 3 and 4, first, the first case portion 11 housing the motor 3 inside and the fourth case portion 14 are fastened to each other in the direction A with the hexagon socket screws 41 to be coupled to each other. Specifically, first, the screw insertion holes 141a of the fourth case portion 14 and the screw holes 111a of the first case portion 11 are aligned with each other. Then, the hexagon socket screws 41 are inserted into the screw insertion holes 141a, whereby the hexagon socket screws 41 are screwed into the screw holes 111a. At this time, the sealing member 50 is formed on a boundary (see the shaded area in FIGS. 3 and 4) between the first case portion 11 and the fourth case portion 14 by applying the liquid sealing agent and drying the same. Furthermore, at this time, the end along arrow A1 of the rotating shaft 31 of the motor 3 is connected to the bearing 142a of the bottom surface portion 142 of the fourth case portion 14.

At this time, the three connection terminal portions 61 corresponding to the terminals TU2, TV2, and TW2 (see FIG. 1) of the motor 3 are inserted into the fourth case portion 14 through the third holes 142b of the fourth case portion 14, as shown in FIG. 24. Then, the connection terminal portions 61 inserted thereinto in this manner are connected to the connection terminal portions 68 mounted through the insulating members (not shown) in the fourth case portion 14 by the screws. Furthermore, at this time, the six connection terminal portions 61 corresponding to the terminals TU3, TV3, TW3, TU4, TV4, and TW4 (see FIG. 1) of the motor 3 are also inserted into the fourth case portion 14 through the third holes 142c.

Then, the aforementioned fourth case portion 14 coupled to the first case portion 11 and the second case portion 12 mounted with the inverter module 1a and the winding switching module 4a are fastened to each other in the direction A with the hexagon socket screws 42 to be coupled to each other, as shown in FIGS. 3 and 4. Specifically, the screw insertion holes 121a of the second case portion 12 and the screw holes 141b of the fourth case portion 14 are aligned with each other. Then, the hexagon socket screws 42 are inserted into the screw insertion holes 121a, and the hexagon socket screws 42 are screwed into the screw holes 141b. At this time, the sealing member 50 is formed on a boundary (see the shaded area in FIGS. 3 and 4) between the second case portion 12 and the fourth case portion 14 by applying the liquid sealing agent and drying the same. Furthermore, at this time, the connection terminal portions 63 corresponding to the terminals TU1, TV1, and TW1 (see FIG. 1) of the inverter portion 1 of the inverter module 1a and the L-shaped connection terminal portions 69 are connected to each other by screws, as shown in FIG. 24.

Then, the aforementioned connection terminal portions 69 connected to the connection terminal portions 63 corresponding to the terminals TU1, TV1, and TW1 (see FIG. 1) of the inverter portion 1 and the connection terminal portions 68 provided in the fourth case portion 14 are connected to each other through the opening 141c by screws, as shown in FIG. 24. Thus, the terminals TU1, TV1, and TW1 (see FIG. 1) of the inverter portion 1 and the terminals TU2, TV2, and TW2 (see FIG. 1) of the motor 3 are electrically connected to each other. The connection terminal portions 65 corresponding to the terminals TU5, TV5, TW5, TU6, TV6, and TW6 (see FIG. 1) of the winding switching portion 4 of the winding switching module 4a and the six connection terminal portions 61 corresponding to the terminals TU3, TV3, TW3, TU4, TV4, and TW4 (see FIG. 1) of the motor 3 are connected to each other through the openings 141d by the screws. Then, the second lids 16 are mounted on the fourth case portion 14 with the screw members 45 to cover the openings 141c and 141d. At this time, the sealing members 50 are formed on the portions (see the shaded areas in FIGS. 3 and 4) between the fourth case portion 14 and the second lids 16 by applying the liquid sealing agent and drying the same.

Then, the aforementioned second case portion 12 coupled to the first case portion 11 and the fourth case portion 14 and the third case portion 13 mounted with the smoothing capacitor 2, the control board 5a, and the power supply board 6a are fastened to each other in the direction A to each other with the hexagon socket screws 43 to be coupled to each other, as shown in FIGS. 3 and 4. Specifically, the screw insertion holes 131a of the third case portion 13 and the screw holes 121b of the second case portion 12 are aligned with each other. Then, the hexagon socket screws 43 are inserted into the screw insertion holes 131a, and the hexagon socket screws 43 are screwed into the screw holes 121b. At this time, the sealing member 50 is formed on a boundary (see the shaded area in FIGS. 3 and 4) between the second case portion 12 and the third case portion 13 by applying the liquid sealing agent and drying the same. Then, the connection terminal portions 64 in the second case portion 12 and the connection terminal portions 66 of the smoothing capacitor 2 in the third case portion 13 are connected to each other by the screws, as shown in FIG. 24. Furthermore, at this time, the inverter module 1a and the winding switching module 4a in the second case portion 12 and the control board 5a and the power supply board 6a in the third case portion 13 are connected to each other through connection wires (not shown) passing through the first holes 122a of the first partition wall 122 and the second holes 132a of the second partition wall 132. The control board 5a and the control portion (not shown) for the entire vehicle 100 provided outside the motor drive portion 10 are connected to each other through the connection wire 60 passing through the through-hole 131c of the side surface portion 131 of the third case portion 13.

Finally, the first lid 15 is mounted on the third case portion 13 to seal the side along arrow A1 of the third case portion 13 coupled to the first case portion 11, the fourth case portion. 14, and the second case portion 12, as shown in FIGS. 3 and 4. Specifically, the screw insertion holes 15a of the first lid 15 and the screw holes 131b of the third case portion 13 are aligned with each other. Then, the screw members 44 are inserted into the screw insertion holes 15a, and the screw members 44 are screwed into the screw holes 131b. At this time, the sealing member 50 is formed on the portion (see the shaded area in FIGS. 3 and 4) between the third case portion 13 and the first lid 15 by applying the liquid sealing agent and drying the same.

In the aforementioned manner, the motor drive portion 10 (see FIG. 2) according to the embodiment is assembled.

According to this embodiment, as hereinabove described, the first case portion 11, the second case portion 12, the third case portion 13, and the fourth case portion 14 housing the inverter portion 1, the motor 3, and the winding switching portion 4 are provided, and the first case portion 11, the fourth case portion 14, the third case portion 13, and the second case portion 12 are coupled to each other. Thus, the first case portion 11, the second case portion 12, the third case portion 13, and the fourth case portion 14 housing the inverter portion 1, the motor 3, and the winding switching portion 4 can be coupled to each other to be integrated, and hence formation of dead spaces between the case portions housing the inverter portion 1, the motor 3, and the winding switching portion 4 can be suppressed. Consequently, the vehicle 100 in which a space for the motor drive portion 10 can be saved can be provided. This advantageous effect is effectively exerted particularly in the vehicle 100 in which it is necessary to arrange a large number of members in a limited arrangement space.

According to this embodiment, as hereinabove described, the motor 3 is housed in the single first case portion 11 different from that housing the inverter portion 1 and the winding switching portion 4. Thus, the inverter portion 1 and the winding switching portion 4 can be separated from the motor 3 that is a heat generator, whereby the inverter portion 1 and the winding switching portion 4 are insusceptible to heat, and hence the inverter portion 1 and the wining switching portion 4 can operate well. Furthermore, disassembly and assembly are facilitated as compared with the case where the inverter portion 1, the motor 3, and the winding switching portion 4 are housed in the same single case portion, and hence maintenance can be promptly carried out (or the maintenance time can be reduced).

According to this embodiment, as hereinabove described, the motor 3 is housed in the first case portion 11, and the inverter portion 1 and the winding switching portion 4 are housed in the second case portion 12. Thus, the simple outer shape of the device including the inverter portion 1, the motor 3, and the winding switching portion 4 can be formed unlike the case where the inverter portion 1 and the winding switching portion 4 are housed in the two different case portions.

According to this embodiment, as hereinabove described, the first partition wall 122 isolating the inverter portion 1 and the winding switching portion 4 from each other is provided in the second case portion 12. Furthermore, the inverter portion 1 is arranged in the region opposite to (along arrow A1) the motor 3 with respect to the first partition wall 122 of the second case portion 12, and the winding switching portion 4 is arranged in the region opposite to (along arrow A2) the inverter portion 1 with respect to the first partition wall 122 of the second case portion 12. Thus, the inverter portion 1 and the winding switching portion 4 can be easily arranged in the second case portion 12 in a state where the inverter portion 1 and the winding switching portion 4 are separated from each other, utilizing spaces (regions) on both sides (along arrow A1 and arrow A2) of the first partition wall 122.

Furthermore, the inverter portion 1 is arranged in the region opposite to (along arrow A1) the motor 3 with respect to the first partition wall 122 of the second case portion 12, and the winding switching portion 4 is arranged in the region opposite to (along arrow A2) the inverter portion 1 with respect to the first partition wall 122 of the second case portion 12, whereby the inverter portion 1 having a smaller number of the terminals (three terminals TU1, TV1, and TW1 (see FIG. 1)) connected to the motor 3 than the winding switching portion 4 can be arranged at a position farther from the motor 3, and the winding switching portion 4 having a larger number of the terminals (six terminals TU5, TV5, TW5, TU6, TV6, TW6 (see FIG. 1)) connected to the motor 3 than the inverter portion 1 can be arranged at a position closer to the motor 3. Thus, the overall length of the wires between the terminals of the motor 3 and the inverter portion 1 and between the terminals of the motor 3 and the winding switching portion 4 can be reduced, and hence the wiring inductance can be reduced.

According to this embodiment, as hereinabove described, the first holes 122a allowing the wires connected to the inverter portion 1 and the winding switching portion 4 (the connection terminal portions 69 (see FIG. 24) connected to the connection terminal portions 63 of the inverter portion 1 by the screws and the wires (not shown) configured to transmit the control signals from the control portion 5 to the inverter portion 1 and the winding switching portion 4, for example) to pass through are provided in the first partition wall 122. Thus, the wires connected to the inverter portion 1 and the winding switching portion 4 can be housed in the second case portion 12 through the first holes 122a, and hence it is not necessary to ensure spaces for arranging the wires connected to the inverter portion 1 and the winding switching portion 4 outside the second case portion 12. Consequently, the space for the motor drive portion 10 can be further saved.

According to this embodiment, as hereinabove described, the first cooling pipe 113 configured to cool the motor 3 and the second cooling pipe 123 configured to cool the inverter portion 1 and the winding switching portion 4 are provided in the first case portion 11 and the second case portion 12, respectively. Thus, the motor 3 can be easily cooled by the first cooling pipe 113, and the inverter portion 1 and the winding switching portion 4 can be easily cooled by the second cooling pipe 123.

According to this embodiment, as hereinabove described, the second cooling pipe 123 is provided to overlap with the switch elements Q1 to Q6 of the inverter portion 1 and the high-speed winding switch SW1 and the low-speed winding switch SW2 of the winding switching portion 4. Thus, the switch elements Q1 to Q6, the high-speed winding switch SW1, and the low-speed winding switch SW2 that are heat generators can be effectively cooled by the second cooling pipe 123.

According to this embodiment, as hereinabove described, in addition to the motor 3, the inverter portion 1, and the winding switching portion 4, the control portion 5 is housed in the first case portion 11, the fourth case portion 14, the second case portion 12, and the third case portion 13 coupled to each other. Thus, formation of the dead spaces between the case portions housing the inverter portion 1, the motor 3, the winding switching portion 4, and the control portion 5 can be further suppressed unlike the case where a dedicated case portion for housing the control portion 5 is provided separately.

According to this embodiment, as hereinabove described, in addition to the motor 3, the inverter portion 1, the winding switching portion 4, and the control portion 5, the power supply portion 6 is housed in the first case portion 11, the fourth case portion 14, the second case portion 12, and the third case portion 13 coupled to each other. Thus, formation of the dead spaces between the case portions housing the inverter portion 1, the motor 3, the winding switching portion 4, the control portion 5, and the power supply portion 6 can be further suppressed unlike the case where a dedicated case portion for housing the power supply portion 6 is provided separately.

According to this embodiment, as hereinabove described, the control portion 5 and the power supply portion 6 are housed in the third case portion 13. Thus, the device configuration can be simplified unlike the case where the control portion 5 and the power supply portion 6 are housed in two different case portions.

According to this embodiment, as hereinabove described, the second partition wall 132 isolating the control portion 5 and the power supply portion 6 from each other is provided in the third case portion 13. Furthermore, the control portion 5 is arranged in the region opposite to (along arrow A1) the motor 3, the inverter portion 1, and the winding switching portion 4 with respect to the second partition wall 132 of the third case portion 13, and the power supply portion 6 is arranged in the region opposite to (along arrow A2) the control portion 5 with respect to the second partition wall 132 of the third case portion 13. Thus, the control portion 5 and the power supply portion 6 can be easily arranged in the third case portion 13, utilizing spaces (regions) on both sides (along arrow A1 and arrow A2) of the second partition wall 132. Furthermore, the control portion 5 can be separated from the motor 3, the inverter portion 1, and the winding switching portion 4 that are heat generators by the second partition wall 132, whereby the control portion 5 is insusceptible to heat, and hence the control portion 5 can operate well.

According to this embodiment, as hereinabove described, the second holes 132a allowing the wires connected to the control portion 5 and the power supply portion 6 (the pair of connection terminal portions 64 (see FIGS. 9, 11, and 24) corresponding to the terminals TP1 and TN1 (see FIG. 1) of the inverter portion 1 and the wires (not shown) configured to transmit the control signals from the control portion 5, for example) to pass through are provided in the second partition wall 132. Thus, the wires connected to the control portion 5 and the power supply portion 6 can be housed in the third case portion 13 through the second holes 132a, and hence it is not necessary to ensure spaces for arranging the wires connected to the control portion 5 and the power supply portion 6 outside the third case portion 13. Consequently, the space for the motor drive portion 10 can be further saved.

According to this embodiment, as hereinabove described, the smoothing capacitor 2 is arranged in a region on the same side (along arrow A1) as the control portion 5 with respect to the second partition wall 132 of the third case portion 13. Thus, the smoothing capacitor 2 can be separated from the motor 3, the inverter portion 1, and the winding switching portion 4 that are the heat generators by the second partition wall 132, whereby the smoothing capacitor 2 is insusceptible to heat. Therefore, a reduction in the performance of the smoothing capacitor 2 resulting from heat is suppressed, so that the reliability (duration of life) of the smoothing capacitor 2 can be further improved.

According to this embodiment, as hereinabove described, the first case portion 11 housing the motor 3, the second case portion 12 housing the inverter portion 1 and the winding switching portion 4, and the third case portion 13 housing the control portion 5 and the power supply portion 6 are coupled to each other along the extensional direction (direction A) of the rotating shaft 31 of the motor 3. Thus, the first case portion 11, the second case portion 12, and the third case portion 13 can be formed linearly to extend along the extensional direction (direction A) of the rotating shaft 31 of the motor 3 by being coupled to each other, and hence the device configuration can be simplified. Furthermore, formation of dead spaces can be further suppressed unlike the case where the first case portion 11, the second case portion 12, and the third case portion 13 are not formed linearly by being coupled to each other.

According to this embodiment, as hereinabove described, the first case portion 11, the second case portion 12, and the third case portion 13 each are formed in the cylindrical shape extending along the extensional direction (direction A) of the rotating shaft 31 of the motor 3. Thus, the first case portion 11, the second case portion 12, and the third case portion 13 in the cylindrical shape can be easily coupled to each other along the extensional direction (direction A) of the rotating shaft 31 of the motor 3.

According to this embodiment, as hereinabove described, the first lid 15 sealing the third case portion 13 is provided on the side (side along arrow A1) of the third case portion 13 opposite to the first case portion 11 and the second case portion 12. Thus, the entry of extraneous material from the side (side along arrow A1) of the third case portion 13 opposite to the first case portion 11 and the second case portion 12 can be suppressed by the first lid 15.

According to this embodiment, as hereinabove described, the fourth case portion 14 housing the connection terminal portions 61, 65, 68, and 69 configured to electrically connect the motor 3 to the inverter portion 1 and the winding switching portion 4 is provided, and the first case portion 11, the fourth case portion 14, the second case portion 12, and the third case portion 13 are coupled to each other along the extensional direction (direction A) of the rotating shaft 31 of the motor 3 in a state where the fourth case portion 14 is arranged between the first case portion 11 and the second case portion 12. Thus, the connection terminal portions 61, 65, 68, and 69 configured to electrically connect the motor 3 to the inverter portion 1 and the winding switching portion 4 can be housed in the fourth case portion 14, and hence it is not necessary to ensure spaces for arranging the connection terminal portions 61, 65, 68, and 69 outside the fourth case portion 14. Consequently, the space for the motor drive portion 10 can be further saved.

Furthermore, the fourth case portion 14 is arranged between the first case portion 11 and the second case portion 12, whereby the inverter portion 1 and the winding switching portion 4 housed in the second case portion 12 and the control portion 5 and the power supply portion 6 housed in the third case portion 13 can be separated from the motor 3, that is the heat generator, housed in the first case portion 11. Thus, the inverter portion 1, the winding switching portion 4, the control portion 5, and the power supply portion 6 are insusceptible to heat, and hence the inverter portion 1, the winding switching portion 4, the control portion 5, and the power supply portion 6 can operate well.

According to this embodiment, as hereinabove described, the openings 141c and 141d are provided in the portion of the side surface portion 141 of the fourth case portion 14 corresponding to the connection terminal portions 61, 68, and 69 and the portions of the side surface portion 141 of the fourth case portion 14 corresponding to the connection terminal portions 61 and 65, respectively, and the openable and closable second lids 16 covering the openings 141c and 141d are provided. Thus, connection and maintenance of the connection terminal portions 61, 65, 68, and 69 can be easily carried out through the openings 141c and 141d. Furthermore, the openings 141c and 141d are covered with the second lids 16, whereby the entry of extraneous material through the openings 141c and 141d can be suppressed.

According to this embodiment, as hereinabove described, the portions of the first case portion 11, the fourth case portion 14, the second case portion 12, and the third case portion 13 coupled to each other, the portion between the third case portion 13 and the first lid 15, and the portions between the fourth case portion 14 and the second lids 16 (see the shaded areas in FIGS. 3 and 4) are sealed with the sealing members 50. Thus, the entry of extraneous material from the portions of the first case portion 11, the fourth case portion 14, the second case portion 12, and the third case portion 13 coupled to each other, the portion between the third case portion 13 and the first lid 15, and the portions between the fourth case portion 14 and the second lids 16 can be suppressed by the sealing members 50.

According to this embodiment, as hereinabove described, the switch elements Q1 to Q6 of the inverter portion 1 and the high-speed winding switch SW1 and the low-speed winding switch SW2 of the winding switching portion 4 each are made of the SiC semiconductor. Thus, the switch elements Q1 to Q6, the high-speed winding switch SW1, and the low-speed winding switch SW2 each are made of the SiC semiconductor having excellent heat resistance, and hence the switch elements Q1 to Q6 of the inverter portion 1 and the high-speed winding switch SW1 and the low-speed winding switch SW2 of the winding switching portion 4 can operate well with respect to heat generated by the operation of the switch elements Q1 to Q6, the high-speed winding switch SW1, and the low-speed winding switch SW2 themselves and heat transmitted through the connection wires 62 etc. from the windings 3a and 3b of the motor 3.

According to this embodiment, as hereinabove described, the first case portion 11, the fourth case portion 14, the second case portion 12, and the third case portion 13 are fastened to each other with the hexagon socket screws 41 to 43 to be coupled to each other. Thus, the first case portion 11, the fourth case portion 14, the second case portion 12, and the third case portion 13 can be easily coupled to each other with the hexagon socket screws 41 to 43.

It should be understood by those skilled in the art that various modifications, combinations, sub-combinations, and alterations may occur depending on design requirements and other factors insofar as they are within the scope of the appended claims or the equivalents thereof.

For example, while the example of applying the motor drive device to the motor drive portion mounted in the vehicle has been shown in the aforementioned embodiment, the motor drive device is also applicable to a common motor drive device other than the motor drive portion mounted in the vehicle.

While the example of housing the control portion and the power supply portion in addition to the motor, the winding switching portion, and the inverter portion (power conversion portion) in the first case portion, the second case portion, the third case portion, and the fourth case portion (four (a plurality of) case portions) coupled to each other has been shown in the aforementioned embodiment, at least the motor, the winding switching portion, and the power conversion portion of the motor, the winding switching portion, the power conversion portion, the control portion, and the power supply portion are simply required to be housed in the plurality of case portions coupled to each other. In this case, at least the motor, the winding switching portion, and the power conversion portion may be housed in two or three case portions coupled to each other or five or more case portions coupled to each other.

While the example of providing the fourth case portion housing the connection terminal portions configured to electrically connect the motor to the winding switching portion and the inverter portion (power conversion portion) has been shown in the aforementioned embodiment, the fourth case portion may not be provided, but only the first case portion, the second case portion, and the third case portion may be coupled to each other.

While the example of housing the motor in the single case portion different from that housing the winding switching portion and the inverter portion (power conversion portion) has been shown in the aforementioned embodiment, the motor and the winding switching portion may be housed in the same case portion, and the power conversion portion may be housed in a case portion different from that housing the motor and the winding switching portion, for example. Alternatively, the motor and the power conversion portion may be housed in the same case portion, and the winding switching portion may be housed in a case portion different from that housing the motor and the power conversion portion.

While the example of housing the winding switching portion and the inverter portion (power conversion portion) in the second case portion has been shown in the aforementioned embodiment, one of the winding switching portion and the power conversion portion may be housed in the second case portion, and the other of the winding switching portion and the power conversion portion may be housed in a case portion other than the second case portion.

While the example of employing the first cooling pipe and the second cooling pipe into which the liquid coolant flows as the first cooling portion and the second cooling portion, respectively has been shown in the aforementioned embodiment, cooling means (air cooling, a cooling element, or the like, for example) other than liquid cooling may be employed as the first cooling portion and the second cooling portion.

While the example of connecting the first end of the second cooling pipe (second cooling portion) configured to cool the winding switching portion and the inverter portion (power conversion portion) and the second end of the first cooling pipe (first cooling portion) configured to cool the motor to each other has been shown in the aforementioned embodiment, the first cooling portion and the second cooling portion may not be connected to each other, but the motor may be cooled independently by the first cooling portion while the winding switching portion and the power conversion portion may be cooled independently by the second cooling portion.

While the example of coupling the first case portion, the second case portion, the third case portion, and the fourth case portion to each other along the extensional direction of the rotating shaft of the motor has been shown in the aforementioned embodiment, the first case portion, the second case portion, the third case portion, and the fourth case portion may be coupled to each other along a direction orthogonal to the extensional direction of the rotating shaft of the motor, for example.

While the example of forming each of the first case portion, the fourth case portion, the second case portion, and the third case portion in the cylindrical shape extending along the extensional direction of the rotating shaft of the motor has been shown in the aforementioned embodiment, the first case portion, the fourth case portion, the second case portion, and the third case portion each may be formed in a shape (box shape, for example) other than the cylindrical shape.

While the example of employing the sealing members formed by drying the liquid sealing agent as the sealing members sealing the portions of the first case portion, the fourth case portion, the second case portion, and the third case portion coupled to each other, the portion between the third case portion and the first case portion, and the portions between the fourth case portion and the second lids has been shown in the aforementioned embodiment, an O-ring, a gasket, grease, etc. may be employed as the sealing member.

Furthermore, heat insulating members may be provided at the portions of the first case portion, the fourth case portion, the second case portion, and the third case portion coupled to each other. According to this, the first case portion, the fourth case portion, the second case portion, and the third case portion can be thermally separated from each other, and hence a cooling effect can be further increased when the first case portion, the fourth case portion, the second case portion, and the third case portion are cooled individually.

While the example of making the switch elements of the inverter portion (power conversion portion) and the high-speed winding switch and the low-speed winding switch (switch element) of the winding switching portion of the SiC semiconductor has been shown in the aforementioned embodiment, the switch elements of the power conversion portion and the winding switching portion may be made of a semiconductor (Si semiconductor, for example) other than the SiC semiconductor or a material other than a semiconductor.

While the example of fastening the first case portion, the second case portion, the third case portion, and the fourth case portion to each other with the hexagon socket screws (fastening member) to be coupled to each other has been shown in the aforementioned embodiment, the first case portion, the second case portion, the third case portion, and the fourth case portion may be fastened to each other with fastening members (swage members or the like, for example) other than the hexagon socket screws to be coupled to each other. Alternatively, the first case portion, the second case portion, the third case portion, and the fourth case portion may be coupled to each other without employing fastening members. For example, the first case portion, the second case portion, the third case portion, and the fourth case portion may be welded to each other to be coupled to each other or may be bonded to each other with an adhesive agent to be coupled to each other.

What is claimed is:

1. A motor drive device comprising:
a motor including a high-speed drive winding and a low-speed drive winding;
a winding switching portion switching connection states of the high-speed drive winding and the low-speed drive winding of the motor;
a power conversion portion connected to the motor; and
a plurality of case portions housing at least the motor, the winding switching portion, and the power conversion portion, wherein
the plurality of case portions are coupled to each other,
the motor is housed in a single case portion of the plurality of case portions different from those housing the winding switching portion and the power conversion portion, and
the plurality of case portions include a first case portion housing the motor and a second case portion housing the winding switching portion and the power conversion portion.

2. The motor drive device according to claim 1, wherein
the second case portion is provided with a first partition wall isolating the winding switching portion and the power conversion portion from each other,
the power conversion portion is arranged in a region opposite to the motor with respect to the first partition wall of the second case portion, and
the winding switching portion is arranged in a region opposite to the power conversion portion with respect to the first partition wall of the second case portion.

3. The motor drive device according to claim 2, wherein
the first partition wall is provided with a first hole allowing a wire connected to the winding switching portion and the power conversion portion to pass through.

4. The motor drive device according to claim 1, wherein
the first case portion and the second case portion are provided with a first cooling portion configured to cool the motor and to second cooling portion configured to cool the winding switching portion and the power conversion portion, respectively.

5. The motor drive device according to claim 4, wherein
the winding switching portion and the power conversion portion include a switch element, and
the second cooling portion is provided to overlap with the switch element.

6. A motor drive device comprising:
a motor including a high-speed drive winding and a low-speed drive winding;
a winding switching portion switching connection states of the high-speed drive winding and the low-speed drive winding of the motor;
a power conversion portion connected to the motor;
a plurality of case portions housing at least the motor, the winding switching portion, and the power conversion portion; and
a control portion controlling the winding switching portion and the power conversion portion, wherein
the plurality of case portions are coupled to each other, and
in addition to the motor, the winding switching portion, and the power conversion portion, the control portion is housed in the plurality of case portions.

7. The motor drive device according to claim 6, wherein
the winding switching portion and the power conversion portion include a switch element,
the motor drive device further comprising a power supply portion supplying power to operate the switch element, wherein
in addition to the motor, the winding switching portion, the power conversion portion, and the control portion, the power supply portion is housed in the plurality of case portions.

8. The motor drive device according to claim 7, wherein
the plurality of case portions include a third case portion housing the control portion and the power supply portion.

9. The motor drive device according to claim 8, wherein
the third case portion is provided with a second partition wall isolating the control portion and the power supply portion from each other,
the control portion is arranged in a region opposite to the motor, the winding switching portion, and the power conversion portion with respect to the second partition wall of the third case portion, and
the power supply portion is arranged in a region opposite to the control portion with respect to the second partition wall of the third case portion.

10. The motor drive device according to claim 9, wherein
the second partition wall is provided with a second hole allowing a wire connected to the control portion and the power supply portion to pass through.

11. The motor drive device according to claim 9, further comprising a smoothing capacitor smoothing power input into the power conversion portion, wherein
the smoothing capacitor is arranged in a region on the same side as the control portion with respect to the second partition wall of the third case portion.

12. The motor drive device according to claim 1, wherein
the winding switching portion and the power conversion portion include a switch element,
the motor drive device further comprising:
a control portion controlling the winding switching portion and the power conversion portion; and
a power supply portion supplying power to operate the switch element, wherein
the plurality of case portions further include a third case portion housing the control portion and the power supply portion, and
the first case portion, the second case portion, and the third case portion are coupled to each other along an extensional direction of a rotating shaft of the motor.

13. The motor drive device according to claim 12, wherein
the first case portion, the second case portion, and the third case portion each are formed in a cylindrical shape extending along the extensional direction of the rotating shaft of the motor.

14. The motor drive device according to claim 12, wherein
a first lid sealing the third case portion is provided on a side of the third case portion opposite to the first case portion and the second case portion.

15. The motor drive device according to claim 12, wherein
the plurality of case portions further include a fourth case portion housing a connection terminal portion configured to electrically connect the motor to the winding switching portion and the power conversion portion, and
the first case portion, the fourth case portion, the second case portion, and the third case portion are coupled to each other along the extensional direction of the rotating shaft of the motor in a state where the fourth case portion is arranged between the first case portion and the second case portion.

16. The motor drive device according to claim 15, wherein
an opening is provided at a portion of a side surface of the fourth case portion corresponding to the connection terminal portion, and
a second lid being openable and closable, covering the opening is provided in the fourth case portion.

17. A motor drive device comprising:
a motor including a high-speed drive winding and a low-speed drive winding;
a winding switching portion switching connection states of the high-speed drive winding and the low-speed drive winding of the motor;
a power conversion portion connected to the motor; and
a plurality of case portions housing at least the motor, the winding switching portion, and the power conversion portion, wherein
the plurality of case portions are coupled to each other,
the winding switching portion and the power conversion portion include a switch element, and
the switch element is made of a SiC semiconductor.

18. A vehicle comprising:
a vehicle body portion; and
a motor drive portion provided inside the vehicle body portion, wherein
the motor drive portion includes:
a motor including a high-speed drive winding and a low-speed drive winding,
a winding switching portion switching connection states of the high-speed drive winding and the low-speed drive winding of the motor,
a power conversion portion connected to the motor, and
a plurality of case portions housing at least the motor, the winding switching portion, and the power conversion portion,
the plurality of case portions are coupled to each other,
the motor is housed in a single case portion of the plurality of case portions different from those housing the winding switching portion and the power conversion portion, and
the plurality of case portions include a first case portion housing the motor and a second case portion housing the winding switching portion and the power conversion portion.

19. A motor drive device comprising:
a motor including a high-speed drive winding and a low-speed drive winding;
a winding switching portion switching connection states of the high-speed drive winding and the low-speed drive winding of the motor;
a power conversion portion connected to the motor; and
a plurality of case portions housing at least the motor, the winding switching portion, and the power conversion portion, wherein
the plurality of case portions are coupled to each other, and
a connection terminal portion configured to electrically connect the motor to the winding switching portion and the power conversion portion is provided in the plurality of case portions.

\* \* \* \* \*